United States Patent
Abotabl et al.

(10) Patent No.: US 12,245,247 B2
(45) Date of Patent: Mar. 4, 2025

(54) CROSS LINK INTERFERENCE MITIGATION IN FULL-DUPLEX NETWORKS

(71) Applicant: QUALCOMM Incorporated, San Diego, CA (US)

(72) Inventors: Ahmed Attia Abotabl, San Diego, CA (US); Marwen Zorgui, San Diego, CA (US); Muhammad Sayed Khairy Abdelghaffar, San Jose, CA (US); Abdelrahman Mohamed Ahmed Mohamed Ibrahim, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 392 days.

(21) Appl. No.: 17/887,316

(22) Filed: Aug. 12, 2022

(65) Prior Publication Data

US 2024/0057099 A1 Feb. 15, 2024

(51) Int. Cl.
*H04W 72/20* (2023.01)
*H04B 7/0456* (2017.01)
(Continued)

(52) U.S. Cl.
CPC .......... *H04W 72/23* (2023.01); *H04B 7/0456* (2013.01); *H04B 7/0617* (2013.01);
(Continued)

(58) Field of Classification Search
CPC ............................ H04B 7/0456; H04B 7/0617; H04B 2215/00; H04L 1/0003; H04L 1/0009;
(Continued)

(56) References Cited

U.S. PATENT DOCUMENTS 9,319,197 B2 * 4/2016 Sahin .................... H04L 1/0025
10,171,276 B2 * 1/2019 Stern-Berkowitz .........
H04L 5/0091
(Continued)

FOREIGN PATENT DOCUMENTS

WO WO 2012/064998 * 5/2012

OTHER PUBLICATIONS

Ahmad et al., Interference Mitigation via Rate-Splitting and Common Message Decoding in Cloud Radio Access Networks, IEEE, 16 pages, Jul. 2, 2019.*

*Primary Examiner* — Frank Duong
(74) *Attorney, Agent, or Firm* — Holland & Hart LLP

(57) ABSTRACT

Methods, systems, and devices for wireless communications are described. Some wireless communications systems may support cross link interference (CLI) mitigation in full-duplex operations. For example, a first user equipment (UE) may encode and precode a first portion of a message according to a first modulation and coding scheme (MCS) and a first precoding matrix and a second portion of the message according to a second MCS and a second precoding matrix. The first precoding matrix may be based on a first communication link between the first UE and a network entity and the second precoding matrix may be based on the first communication link and a second communication link between the first UE and a second UE. The first UE may transmit the first portion of the message and the second portion of the message via beams associated with respective precoding matrices.

30 Claims, 17 Drawing Sheets

(51) Int. Cl.
*H04B 7/06* (2006.01)
*H04L 1/00* (2006.01)
*H04L 5/14* (2006.01)
*H04W 72/1263* (2023.01)
*H04W 72/23* (2023.01)

(52) U.S. Cl.
CPC .............. *H04L 1/0003* (2013.01); *H04L 5/14* (2013.01); *H04W 72/1263* (2013.01)

(58) Field of Classification Search
CPC .... H04L 5/14; H04L 25/03898; H04W 72/23; H04W 72/1263; H04W 72/1268
See application file for complete search history.

(56) References Cited

U.S. PATENT DOCUMENTS

| | | | |
|---|---|---|---|
| 2022/0400475 A1* | 12/2022 | Suh | H04W 72/23 |
| 2023/0379017 A1* | 11/2023 | Kim | H04B 7/0456 |
| 2023/0388045 A1* | 11/2023 | Khoshnevisan | H04L 1/0009 |
| 2023/0397208 A1* | 12/2023 | Khoshnevisan | H04L 1/0003 |

* cited by examiner

CROSS LINK INTERFERENCE MITIGATION IN FULL-DUPLEX NETWORKS

FIELD OF TECHNOLOGY

The following relates to wireless communications, including cross link interference (CLI) mitigation in full-duplex networks.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support cross link interference (CLI) mitigation in full-duplex networks. Generally, techniques described herein may enable a first user equipment (UE) to separately encode and precode a first portion of an uplink message and a second portion of the uplink message, such that a second UE may decode the first portion of the message to perform CLI mitigation. For example, the first UE may encode the first portion of the uplink message according to a first modulation and coding scheme (MCS) and the second portion of the uplink message according to a second MCS, where the uplink message is scheduled by an uplink grant transmitted by a network entity. Additionally, the first UE may precode the first portion of the uplink message using a first precoding matrix and the second portion of the uplink message according to a second precoding matrix, where the first precoding matrix is based on a first communication link between the first UE and the network entity, and the second precoding matrix is based on the first communication link and a second communication link between the first UE and a second UE. The first UE may transmit the first portion of the message via a first beam associated with the first precoding matrix and the second portion of the message via a second beam associated with the second precoding matrix.

In some cases, the second UE may receive, from the first UE, the second portion of the uplink message via the second beam, where the second portion of the uplink message creates interference with a downlink message transmitted to the second UE from the network entity. As such, the second UE may decode the second portion of the uplink message based on one or more parameters associated with the second portion of the uplink message, such as the second MCS and the second precoding matrix. In some cases, the second UE may treat the first portion of the uplink message as noise. Additionally, the second UE may decode the downlink message based on performing an interference cancellation procedure, where the interference cancellation procedure is based on decoding the second portion of the uplink message.

Additionally, or alternatively, the network entity may receive the first portion of the message associated with the first MCS via the first beam associated with the first precoding matrix and the second portion of the message associated with the second MCS via the second beam associated with the second precoding matrix. The network entity may decode the first portion of the message and the second portion of the message to obtain information associated with the message scheduled by the uplink grant.

A method for wireless communications at a first UE is described. The method may include encoding a first portion of a message according to a first MCS and a second portion of the message according to a second MCS, where the message is scheduled by an uplink grant, precoding the first portion of the message using a first precoding matrix and the second portion of the message using a second precoding matrix, where the first precoding matrix is based on a first communication link between the first UE and a network entity, and where the second precoding matrix is based on the first communication link and a second communication link between the first UE and a second UE, and transmitting the first portion of the message via a first beam associated with the first precoding matrix and the second portion of the message via a second beam associated with the second precoding matrix, where the first portion of the message and the second portion of the message are transmitted according to the uplink grant.

An apparatus for wireless communications at a first UE is described. The apparatus may include a processor, memory coupled with the processor, and instructions stored in the memory. The instructions may be executable by the processor to cause the apparatus to encode a first portion of a message according to a first MCS and a second portion of the message according to a second MCS, where the message is scheduled by an uplink grant, precode the first portion of the message using a first precoding matrix and the second portion of the message using a second precoding matrix, where the first precoding matrix is based on a first communication link between the first UE and a network entity, and where the second precoding matrix is based on the first communication link and a second communication link between the first UE and a second UE, and transmit the first portion of the message via a first beam associated with the first precoding matrix and the second portion of the message via a second beam associated with the second precoding matrix, where the first portion of the message and the second portion of the message are transmitted according to the uplink grant.

Another apparatus for wireless communications at a first UE is described. The apparatus may include means for encoding a first portion of a message according to a first MCS and a second portion of the message according to a second MCS, where the message is scheduled by an uplink grant, means for precoding the first portion of the message using a first precoding matrix and the second portion of the message using a second precoding matrix, where the first precoding matrix is based on a first communication link between the first UE and a network entity, and where the second precoding matrix is based on the first communication link and a second communication link between the first UE and a second UE, and means for transmitting the first portion of the message via a first beam associated with the first precoding matrix and the second portion of the message via a second beam associated with the second precoding matrix, where the first portion of the message and the second portion of the message are transmitted according to the uplink grant.

A non-transitory computer-readable medium storing code for wireless communications at a first UE is described. The code may include instructions executable by a processor to encode a first portion of a message according to a first MCS and a second portion of the message according to a second MCS, where the message is scheduled by an uplink grant, precode the first portion of the message using a first precoding matrix and the second portion of the message using a second precoding matrix, where the first precoding matrix is based on a first communication link between the first UE and a network entity, and where the second precoding matrix is based on the first communication link and a second communication link between the first UE and a second UE, and transmit the first portion of the message via a first beam associated with the first precoding matrix and the second portion of the message via a second beam associated with the second precoding matrix, where the first portion of the message and the second portion of the message are transmitted according to the uplink grant.

Some examples of the method, apparatuses, and non-transitory computer-readable medium described herein may further include operations, features, means, or instructions for receiving control signaling including an uplink grant that schedules the message, where the uplink grant includes an indication to separately encode and precode the first portion of the message and the second portion of the message.

In some examples of the method, apparatuses, and non-transitory computer-readable medium described herein, the uplink grant includes an indication of one or more parameters associated with separately encoding and precoding the first portion of the message and the second portion of the message.

In some examples of the method, apparatuses, and non-transitory computer-readable medium described herein, the one or more parameters include one or more precoding matrices, one or more sets of resources, one or more MCSs, or any combination thereof.

Some examples of the method, apparatuses, and non-transitory computer-readable medium described herein may further include operations, features, means, or instructions for selecting the first precoding matrix based on a first set of one or more channel metrics associated with the first communication link between the first UE and the network entity and selecting the second precoding matrix based on the first set of one or more channel metrics associated with the first communication link and further based on a second set of one or more channel metrics associated with the second communication link between the first UE and the second UE.

Some examples of the method, apparatuses, and non-transitory computer-readable medium described herein may further include operations, features, means, or instructions for receiving control signaling including an indication of one or more parameters associated with splitting the message into the first portion of the message and the second portion of the message, where the first portion of the message and the second portion of the message may be based on the one or more parameters.

In some examples of the method, apparatuses, and non-transitory computer-readable medium described herein, the one or more parameters include a percentage of bits allocated to the first portion of the message, a percentage of bits allocated to the second portion of the message, or both.

In some examples of the method, apparatuses, and non-transitory computer-readable medium described herein, the one or more parameters include a quantity of bits allocated to the first portion of the message, a quantity of bits allocated to the second portion of the message, or both.

Some examples of the method, apparatuses, and non-transitory computer-readable medium described herein may further include operations, features, means, or instructions for transmitting, to the second UE, control signaling indicating one or more parameters associated with separately encoding and precoding the first portion of the message and the second portion of the message.

In some examples of the method, apparatuses, and non-transitory computer-readable medium described herein, the one or more parameters include one or more precoding matrices, one or more sets of time resources and frequency resources for transmitting the message, one or more MCSs, or any combination thereof.

Some examples of the method, apparatuses, and non-transitory computer-readable medium described herein may further include operations, features, means, or instructions for transmitting, to the network entity, an indication of one or more parameters associated with the second communication link between the first UE and the second UE.

Some examples of the method, apparatuses, and non-transitory computer-readable medium described herein may further include operations, features, means, or instructions for transmitting, to the network entity, an indication of a security agreement between the first UE and the second UE.

A method for wireless communications at a first UE is described. The method may include receiving, from a second UE, a portion of a first message via a first beam, where the first message creates interference with a second message received from a network entity, decoding the portion of the first message, where decoding the portion of the first message is based on one or more parameters associated with the portion of the first message, and decoding the second message based on decoding the portion of the first message.

An apparatus for wireless communications at a first UE is described. The apparatus may include a processor, memory coupled with the processor, and instructions stored in the memory. The instructions may be executable by the processor to cause the apparatus to receive, from a second UE, a portion of a first message via a first beam, where the first message creates interference with a second message received from a network entity, decode the portion of the first message, where decoding the portion of the first message is based on one or more parameters associated with the portion of the first message, and decode the second message based on decoding the portion of the first message.

Another apparatus for wireless communications at a first UE is described. The apparatus may include means for receiving, from a second UE, a portion of a first message via a first beam, where the first message creates interference with a second message received from a network entity, means for decoding the portion of the first message, where decoding the portion of the first message is based on one or more parameters associated with the portion of the first message, and means for decoding the second message based on decoding the portion of the first message.

A non-transitory computer-readable medium storing code for wireless communications at a first UE is described. The code may include instructions executable by a processor to receive, from a second UE, a portion of a first message via a first beam, where the first message creates interference with a second message received from a network entity, decode the portion of the first message, where decoding the portion of the first message is based on one or more parameters associated with the portion of the first message, and decode the second message based on decoding the portion of the first message.

Some examples of the method, apparatuses, and non-transitory computer-readable medium described herein may further include operations, features, means, or instructions for receiving control signaling indicating the one or more parameters associated with the portion of the first message.

In some examples of the method, apparatuses, and non-transitory computer-readable medium described herein, the one or more parameters include one or more precoding matrices, one or more sets of time resources and frequency resources for transmitting the first message, one or more MCSs, a processing delay, or any combination thereof.

In some examples of the method, apparatuses, and non-transitory computer-readable medium described herein, the control signaling may be received from the second UE, the network entity, or both.

Some examples of the method, apparatuses, and non-transitory computer-readable medium described herein may further include operations, features, means, or instructions for performing an interference cancellation procedure based on decoding the portion of the first message, where decoding the second message may be based on performing the interference cancellation procedure.

Some examples of the method, apparatuses, and non-transitory computer-readable medium described herein may further include operations, features, means, or instructions for transmitting, to the network entity, an indication of a security agreement between the first UE and the second UE.

A method for wireless communications at a network entity is described. The method may include transmitting control signaling including an uplink grant scheduling a message, where the uplink grant includes an indication to separately encode and precode a first portion of the message and a second portion of the message, receiving the first portion of the message associated with a first MCS via a first beam associated with a first precoding matrix and the second portion of the message associated with a second MCS via a second beam associated with a second precoding matrix, where receiving the first portion of the message and the second portion of the message is based on the uplink grant, and decoding the first portion of the message and the second portion of the message to obtain information associated with the message scheduled by the uplink grant.

An apparatus for wireless communications at a network entity is described. The apparatus may include a processor, memory coupled with the processor, and instructions stored in the memory. The instructions may be executable by the processor to cause the apparatus to transmit control signaling including an uplink grant scheduling a message, where the uplink grant includes an indication to separately encode and precode a first portion of the message and a second portion of the message, receive the first portion of the message associated with a first MCS via a first beam associated with a first precoding matrix and the second portion of the message associated with a second MCS via a second beam associated with a second precoding matrix, where receiving the first portion of the message and the second portion of the message is based on the uplink grant, and decode the first portion of the message and the second portion of the message to obtain information associated with the message scheduled by the uplink grant.

Another apparatus for wireless communications at a network entity is described. The apparatus may include means for transmitting control signaling including an uplink grant scheduling a message, where the uplink grant includes an indication to separately encode and precode a first portion of the message and a second portion of the message, means for receiving the first portion of the message associated with a first MCS via a first beam associated with a first precoding matrix and the second portion of the message associated with a second MCS via a second beam associated with a second precoding matrix, where receiving the first portion of the message and the second portion of the message is based on the uplink grant, and means for decoding the first portion of the message and the second portion of the message to obtain information associated with the message scheduled by the uplink grant.

A non-transitory computer-readable medium storing code for wireless communications at a network entity is described. The code may include instructions executable by a processor to transmit control signaling including an uplink grant scheduling a message, where the uplink grant includes an indication to separately encode and precode a first portion of the message and a second portion of the message, receive the first portion of the message associated with a first MCS via a first beam associated with a first precoding matrix and the second portion of the message associated with a second MCS via a second beam associated with a second precoding matrix, where receiving the first portion of the message and the second portion of the message is based on the uplink grant, and decode the first portion of the message and the second portion of the message to obtain information associated with the message scheduled by the uplink grant.

In some examples of the method, apparatuses, and non-transitory computer-readable medium described herein, transmitting the control signaling may include operations, features, means, or instructions for transmitting the control signaling including the uplink grant that schedules the message, where the uplink grant includes an indication of one or more parameters associated with separately encoding and precoding the first portion of the message and the second portion of the message.

In some examples of the method, apparatuses, and non-transitory computer-readable medium described herein, the one or more parameters include one or more precoding matrices, one or more sets of time resources and frequency resources for transmitting the message, one or more MCSs, or any combination thereof.

In some examples of the method, apparatuses, and non-transitory computer-readable medium described herein, the one or more precoding matrices includes a first precoding matrix based on a first communication link between a first UE and the network entity and a second precoding matrix based on the first communication link and a second communication link between the first UE and a second UE.

Some examples of the method, apparatuses, and non-transitory computer-readable medium described herein may further include operations, features, means, or instructions for receiving an indication of one or more parameters associated with the second communication link between the first UE and the second UE.

Some examples of the method, apparatuses, and non-transitory computer-readable medium described herein may further include operations, features, means, or instructions for transmitting control signaling including an indication of one or more parameters associated with splitting the message into the first portion of the message and the second portion of the message, where the first portion of the message and the second portion of the message may be based on the one or more parameters.

In some examples of the method, apparatuses, and non-transitory computer-readable medium described herein, the one or more parameters indicates a percentage of bits allocated to the first portion of the message, a percentage of bits allocated to the second portion of the message, or both.

In some examples of the method, apparatuses, and non-transitory computer-readable medium described herein, the one or more parameters indicates a quantity of bits allocated to the first portion of the message, a quantity of bits allocated to the second portion of the message, or both.

Some examples of the method, apparatuses, and non-transitory computer-readable medium described herein may further include operations, features, means, or instructions for transmitting control signaling indicating one or more parameters associated with separately encoding and precoding the first portion of the message and the second portion of the message.

In some examples of the method, apparatuses, and non-transitory computer-readable medium described herein, the one or more parameters include one or more precoding matrices, one or more sets of resources, one or more MCSs, a processing delay, or any combination thereof.

Some examples of the method, apparatuses, and non-transitory computer-readable medium described herein may further include operations, features, means, or instructions for receiving an indication of a security agreement between a first UE and a second UE.

DETAILED DESCRIPTION

Figure 1:
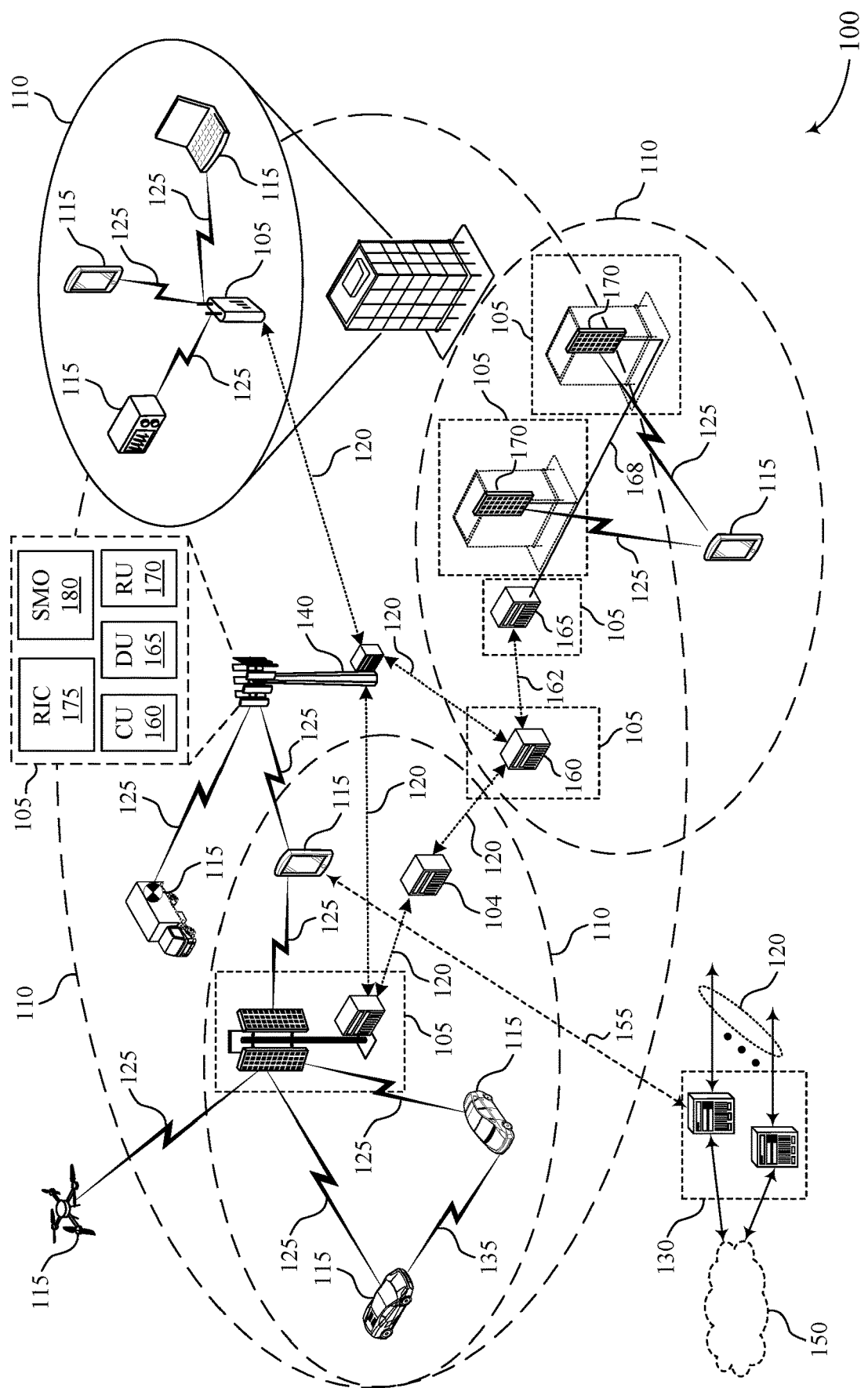
FIGS. 1, 2A, 2B, and 2C each illustrate examples of a wireless communications system that supports cross link interference (CLI) mitigation in full-duplex networks in accordance with one or more aspects of the present disclosure.

In some wireless communications systems, a communication device, such as a user equipment (UE) or a network entity, may support wireless communications over one or multiple radio access technologies. Examples of radio access technologies may include fourth generation (4G) systems, such as Long Term Evolution (LTE) systems, and fifth generation (5G) systems, which may be referred to as NR systems. In such cases, the communication device may operate in a half-duplex mode or a full-duplex mode, or a combination thereof. In a half-duplex mode, the communication device may either transmit communications or receive communications during a time period, such as a transmission time interval (TTI) that may span one or more time resources (e.g., symbols, mini-slots, slots, etc.). In a full-duplex mode, the communication device may simultaneously transmit and receive communications during the time period. That is, communications received by the communication device may overlap in the time domain with communications transmitted by the communication device.

In some examples, neighboring communication devices (e.g., UEs, network entities, or the like) may perform full-duplex communications or half-duplex time division duplexing (TDD) concurrently, such that communications transmitted by a first communication device, such as a first UE, may overlap in time with communications received by a second communication device, such as a second UE (e.g., a neighboring communication device). In such an example, the communications transmitted by the first UE may interfere with the communications received at the second UE. Such interference may be referred to as cross-link interference (CLI) or other similar terminology. In some examples, CLI may degrade wireless communications between the second UE and the network.

Accordingly, techniques described herein may support CLI mitigation in full-duplex operations. For example, a first UE (e.g., an aggressor UE) may receive, from a network entity, an uplink grant scheduling an uplink message and may split the uplink message into a first portion of the uplink message and the second portion of the uplink message. Further, the first UE may separately encode each portion of the uplink message according to respective modulation and coding schemes (MCSs) and separately precode each portion of the uplink message according to respective precoding matrices. For example, a first MCS and a first precoding matrix associated with the first portion of the uplink message may be based on a first communication link between the first UE and the network entity. Additionally, a second MCS and a second precoding matrix associated with the second portion of the uplink message may be based on the first communication link and a second communication link between the first UE and a second UE (e.g., victim UE), where the second UE experiences CLI due to the first UE. As such, the network entity may decode the first portion of the uplink message and the second portion of the uplink message to receive the uplink message from the first UE and the second UE may decode the second portion of the uplink message and treat the first portion of the uplink message as noise. Thus, the second UE may perform interference mitigation and decode a downlink message transmitted by the network entity based on decoding the second portion of the uplink message.

Aspects of the disclosure are initially described in the context of wireless communications systems. Aspects of the disclosure are then described in the context of full-duplex operation schemes and a process flow. Aspects of the disclosure are further illustrated by and described with reference to apparatus diagrams, system diagrams, and flowcharts that relate to cross link interference mitigation in full-duplex networks.

FIG. 1 illustrates an example of a wireless communications system 100 that supports cross link interference mitigation in full-duplex networks in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support cross link interference mitigation in full-duplex networks as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by)

the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some cases, the wireless communications systems 100 may support full-duplex operations, described with reference to FIGS. 2 and 3. That is, a wireless device, such as a network entity 105, may simultaneously transmit communications, such as downlink messages, and receive communications, such as uplink messages. For example, symbols occupied by uplink messages may overlap with symbols occupied by downlink messages. In some cases, neighboring communication devices, such as a first UE 115 (e.g., an aggressor UE 115) and a second UE 115 (e.g., a victim UE 115), may communicate with a communication device supporting full-duplex operations, such as the network entity 105, such that uplink messages transmitted by the first UE 115 may overlap in time with downlink messages received by the second UE 115. In such examples, the uplink messages transmitted by the first UE 115 may interfere with downlink messages received at the second UE 115, which may be referred to as CLI. In some examples, CLI may degrade wireless communications between the second UE 115 and the network entity 105, such that the second UE 115 may be unable to decode the downlink messages received from the network entity 105.

As such, the wireless communications system 100 may support CLI mitigation in full-duplex operations. For example, the first UE 115 may receive, from a network entity 105, an uplink grant scheduling an uplink message and may split the uplink message into a first portion of the uplink message and the second portion of the uplink message. Further, the first UE 115 may separately encode each portion of the uplink message according to respective MCSs and separately precode each portion of the uplink message according to respective precoding matrices. For example, a first MCS and a first precoding matrix associated with the first portion of the uplink message may be based on a first communication link 125 between the first UE 115 and the network entity 105. Additionally, a second MCS and a second precoding matrix associated with the second portion of the uplink message may be based on the first communication link 125 and a second communication link 125 between the first UE 115 and the second UE 115. As such, the network entity 105 may decode the first portion of the uplink message and the second portion of the uplink message to receive the uplink message from the first UE 115 and the second UE 115 may decode the second portion of the uplink message and treat the second portion of the uplink message as noise. Thus, the second UE 115 may perform interference mitigation and decode a downlink message transmitted by the network entity 105 based on decoding the second portion of the uplink message.

Accordingly, consistent with techniques as described herein, when a first UE 115 (e.g., an aggressor UE 115) may be transmitting uplink signaling concurrent with a second UE 115 (e.g., a victim UE 115) receiving downlink signaling, the aggressor UE 115 may split an uplink into two portions that are separately encoded and precoded, which in some case may be referred to as rate splitting. A first portion of the message may be encoded and precoded based on an MCS and a precoder chosen to support decoding of the first portion by both the network entity 115 and the victim UE 115 (e.g., a wider beam may be used). A second portion of the message may be encoded and precoded based on a different MCS and a different precoder chosen to support decoding of the second by the network entity, without regard to decodability by the victim UE 115 (e.g., a narrower beam may be used). The decodability of the first portion of the message may allow the victim UE 115 to perform interference cancellation on that portion, and the victim UE 115 may treat the second portion as noise. This may beneficially avoid degrading downlink throughput for the victim UE 115 to the same extent that would occur if no portion of the message were decodable by the victim UE 115 while also beneficially avoiding degrading uplink throughput for the aggressor UE 115 to the same extent that would occur if all of the message were decodable by the victim UE (due to encoding schemes and precoders that support decodability for the victim UE 115 potentially being sub-optimal for the channel between the aggressor UE 115 and the network entity 105), among other potential benefits.

Figure 2A:
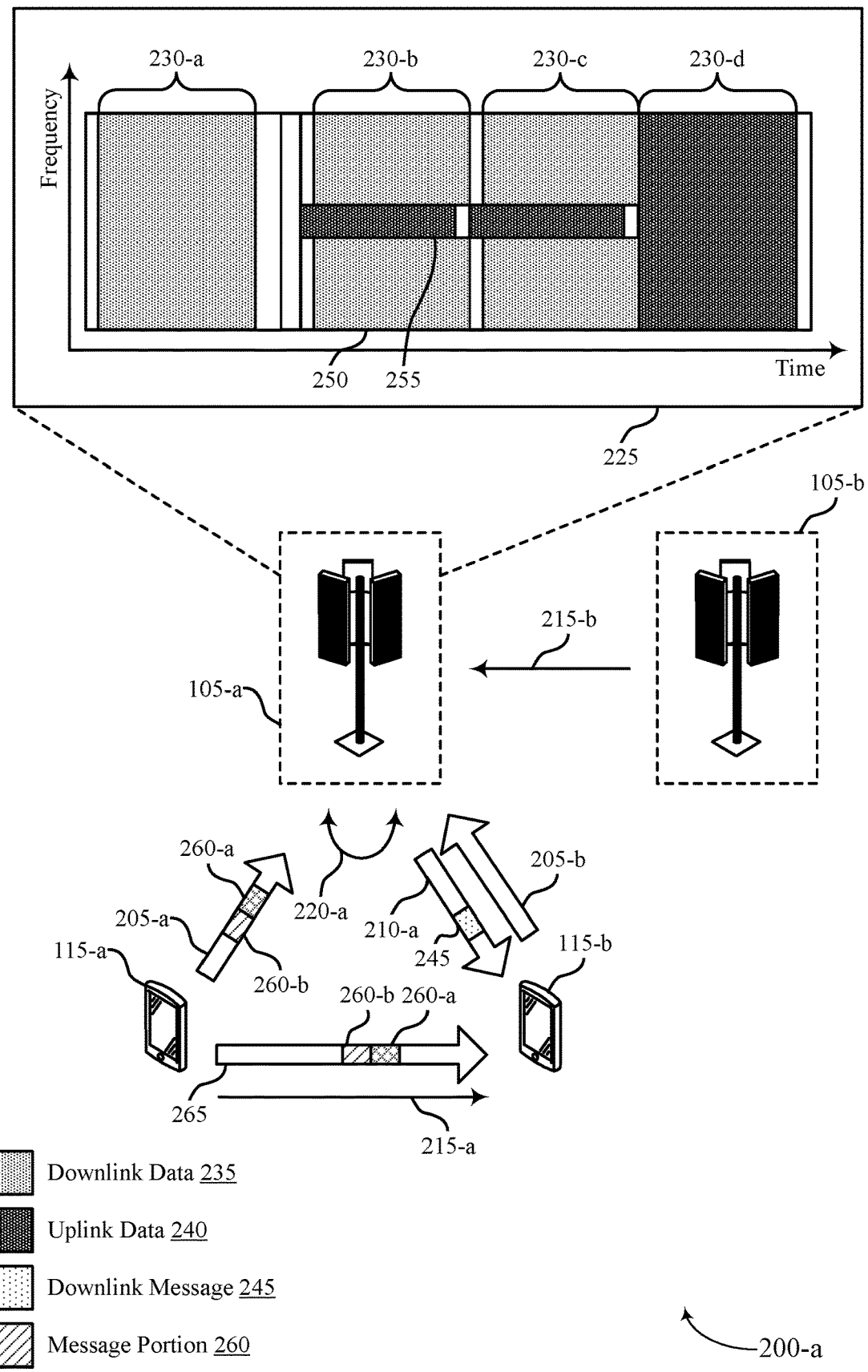
Figure 2B:
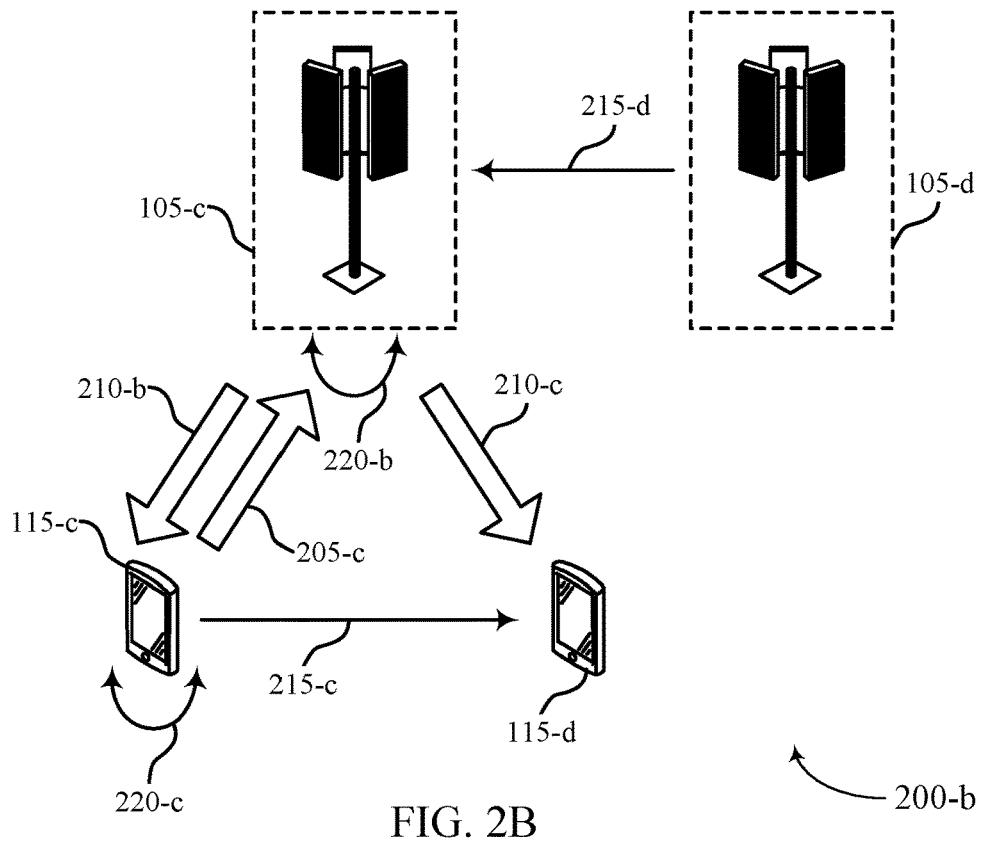
Figure 2C:
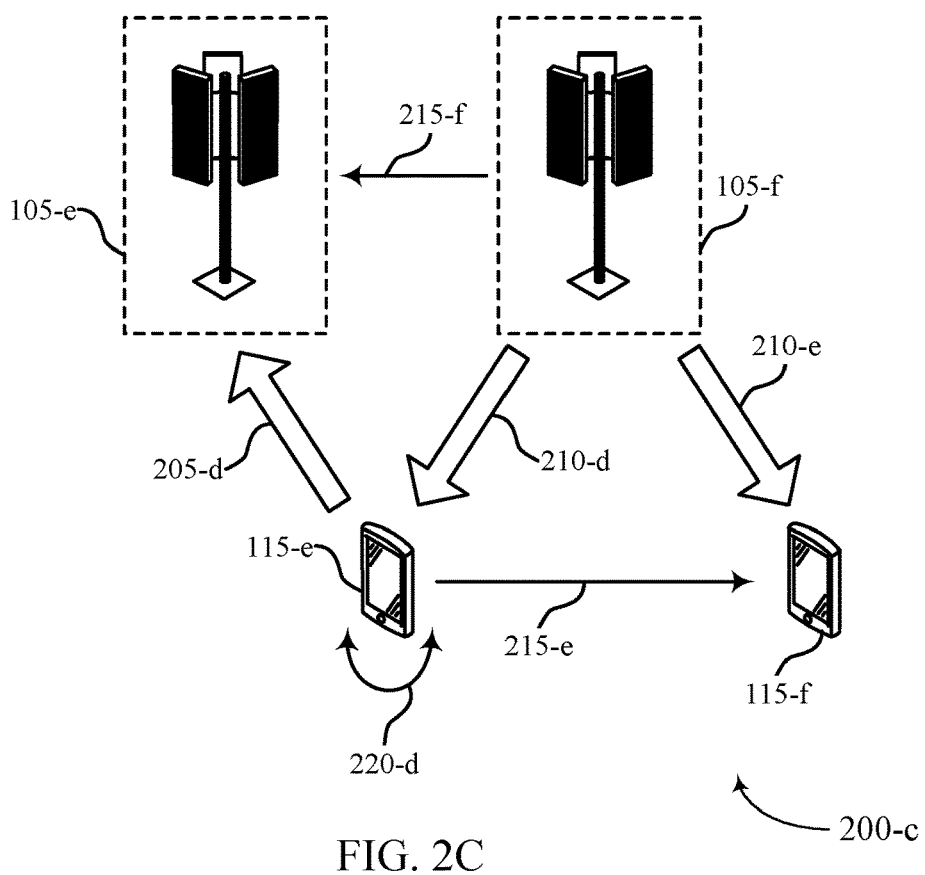

FIGS. 2A, 2B, and 2C each illustrate an example of a wireless communications system 200 that supports CLI mitigation in full-duplex networks in accordance with one or more aspects of the present disclosure. In some examples, the wireless communications systems 200 (e.g., a wireless communications system 200-a, a wireless communications system 200-b, and a wireless communications system 200-c) may implement aspects of the wireless communications system 100. For example, the wireless communications systems 200 may each include one or more network entities 105 (e.g., a network entity 105-a, a network entity 105-b, a network entity 105-c, a network entity 105-d, a network entity 105-e, and a network entity 105-f) and one or more UEs 115 (e.g., a UE 115-a, a UE 115-b, a UE 115-c, a UE 115-d, a UE 115-e, and a UE 115-f), which may be examples of the corresponding devices as described with reference to FIG. 1. In the example of FIGS. 2A, 2B, and 2C, the network entities 105 may be examples of a CU 160, a DU 165, an RU 170, a base station 140, an IAB node 104, or one or more other network nodes as described with reference to FIG. 1. The wireless communications systems 200 may include features for improved communications between the UEs 115 and the network, among other benefits.

In the examples of FIGS. 2A, 2B, and 2C, the UEs 115 and the network entities 105 may communicate via one or more communication links 210 (e.g., a communication link 205-a, a communication link 205-b, a communication link 205-c, and a communication link 205-d) and via one or more communication links 210 (e.g., a communication link 210-a, a communication link 210-b, a communication link 210-c, a communication link 210-d, and a communication link 210-e). The communication links 205 may be examples of uplinks and the communication links 210 may be examples of downlinks. Additionally, or alternatively, the communication links 205 and the communication links 210 may each be examples of a communication link 125 as described with reference to FIG. 1. Each wireless communications system 200 may illustrate communication devices (e.g., one or more UEs 115, one or more network entities 105) operating in a full-duplex mode (e.g., performing full-duplex wireless communications) or a half-duplex TDD mode (e.g., performing half-duplex TDD wireless communications). That is, full-duplex (or half-duplex TDD) capabilities may be present at one or more network entities 105, one or more UEs 115 (or both). For example, the wireless communications systems 200 may support TDD radio frequency bands (e.g., radio frequency spectrum bands configured for TDD communications), FDD radio frequency bands (e.g., radio frequency spectrum bands configured for FDD communications), full-duplex communications at one or more network entities 105 (and/or one or more UEs 115), half-duplex communications at one or more UE 115, or any combination thereof.

Each wireless communications system 200 may support multiple types of full-duplex operations. For example, a communication device operating within the wireless communications systems 200 (e.g., a network entity 105, a UE 115) may support in-band full-duplex (IBFD) operations, sub-band FDD (SBFD) operations (e.g., frequency duplex operations), or both. In some examples of IBFD operations, the communication device may transmit and receive wireless communications on a same time and frequency resource (e.g., a same slot and component carrier bandwidth). For example, downlink communications and uplink communications may share time and frequency resources (e.g., IBFD time and frequency resources). In some examples, the time and frequency resources may partially overlap or fully overlap. Additionally, or alternatively, for SBFD operations, the communications device may transmit and receive communications at over a same time resource and one or more different frequency resources. That is, the downlink resources may be separated from the uplink resource in the frequency domain.

In the example of FIG. 2A, the network entity 105-a may support SBFD operations, such that downlink communications transmitted by the network entity 105-a (e.g., to the UE 115-b) may overlap in time with uplink communications received by the network entity 105-a (e.g., from the UE 115-a). In some examples, the network entity 105-a may configure communications for the UE 115-a and the UE 115-b according to the resource structure 225. The resource structure 225 may include time domain resources (e.g., slots, symbols) allocated for downlink data 235 (e.g., a time domain resource 230-*a*), time domain resources allocated for uplink data 240 (e.g., a time domain resource 230-*d*), and one or more time domain resources allocated for both downlink data 235 and uplink data 240 (e.g., a time domain resource 230-*b* and a time domain resource 230-*c*).

In some examples, the time domain resources allocated for both downlink data 235 and uplink data 240 (e.g., the time domain resource 230-*b* and the time domain resource 230-*c*) may be referred to as D+U slots (or D+U symbols). In some examples, a D+U slot may include half-duplex symbols (e.g., downlink symbols or uplink symbols) or full-duplex symbols (e.g., both downlink symbols and uplink symbols). For example, the time domain resource 230-*b* and the time domain resource 230-*c* (e.g., D+U slots) may be examples of slots, in which a radio frequency band is used for both transmitting uplink communications (e.g., uplink transmissions) and transmitting downlink communications (e.g., downlink transmissions). In some examples, the uplink transmissions and the downlink transmissions may occur in overlapping bands (e.g., for IBFD operations) or adjacent bands (e.g., for SBFD operations).

For SBFD operations in which uplink transmissions and downlink transmissions occur in adjacent bands, a half-duplex communication device may either transmit in an uplink radio frequency band or receive in a downlink radio frequency band. That is, for a given time domain resource (e.g., for a given D+U slot or a given D+U symbol), such as the time domain resource 230-*b*, the half-duplex device (e.g., the UE 115-*a*, the UE 115-*b*) may transmit uplink data 240 (e.g., perform a PUSCH transmission) in the uplink radio frequency band 255 or receive downlink data 235 the downlink radio frequency band 250. For example, the UE 115-*a* may transmit uplink data 240 in the uplink radio frequency band 255, while the UE 115-*b* receives downlink data 235 the downlink radio frequency band 250.

Additionally, or alternatively, for SBFD operations in which uplink and downlink transmissions occur in adjacent bands, a full-duplex device may transmit in the uplink radio frequency band and receive in the downlink radio frequency band. That is, for a given time domain resource (e.g., for a given D+U slot or a given D+U symbol), such as the time domain resource 230-*b*, the full-duplex device may transmit uplink data 240 (e.g., perform a PUSCH transmission) in the uplink radio frequency band 255 and receive downlink data 235 the downlink radio frequency band 250. In the example of FIG. 2B, the UE 115-*c* (e.g., a full-duplex device) may transmit communications in an uplink radio frequency band, while receiving communications in a downlink radio frequency band (e.g., over a same D+U slot or a same D+U symbol).

In some examples, full-duplex communications may provide for latency reduction. For example, latency savings may be enabled by receiving downlink signal in uplink slots. Moreover, full-duplex communications may provide for spectrum efficiency enhancement (e.g., per cell or per UE), efficient resource utilization, and coverage extension, among other benefits. In some examples, however, full-duplex communications may lead to one or more types of interference, such as inter-cell interference (e.g., from neighboring communication devices), self-interference (e.g., for full-duplex communication devices), and CLI (e.g., inter-cell CLI or intra-cell CLI). For example, a communication device (e.g., one or more network entities 105, one or more UEs 115) may experience self-interference 220 (e.g., a self-interference 220-*a*, a self-interference 220-*b*, a self-interference 220-*c*, and a self-interference 220-*d*) between a pair of beams, such as a beam used for transmitting communications and a beam used die receiving communications. In some examples, self-interference may result from signal leakage between an antenna panel used to transmit communications and an antenna panel used to receive communications.

Additionally, or alternatively, neighboring communication devices (e.g., neighboring UEs 115, neighboring network entities 105) may perform full-duplex communications (or half-duplex TDD) concurrently, such that communications received by a first communication device may overlap in time with communications transmitted by a second communication device (e.g., a neighboring communication device). In such an example, the communications transmitted by the second communication device may interfere with the communications received at the first communication device. For example, the communications transmitted by the second communication device may lead to CLI at the first communications device. In some examples, CLI (e.g., CLI 215-*a*, CLI 215-*b*, CLI 215-*c*, CLI 215-*d*, CLI 215-*e*, or CLI 215-*f*) may result from energy leakage due to timing and frequency unalignment (e.g., misalignment) between the neighboring communication devices.

Additionally or alternatively CLI may result from automatic gain control (AGC) mismatch (e.g., misalignment). For example, as illustrated in the example of FIG. 2A, the AGC of the UE 115-*b* may be driven (e.g., controlled) by downlink communications from a serving cell (e.g., the network entity 105-*a*). In such an example, uplink communications transmitted from the UE 115-*a* may saturate the AGC of the UE 115-*b*, resulting in a misalignment (e.g., a loss of orthogonality) of the downlink communications received by the UE 115-*b* and the uplink communications transmitted by the UE 115-*a*. In some examples, the misalignment of the downlink communications and the uplink communications may lead to CLI 215-*a* at the UE 115-*b*.

In some examples, the network entity 105-*a* may be operating in a full-duplex mode (e.g., SBFD or IBFD) and the UEs 115 (e.g., the UE 115-*a* and the UE 115-*b*) may be operating in a half-duplex mode. For example, the network entity 105-*a* may receive uplink communications from the UE 115-*a* (e.g., via the communication link 205-*a*), while simultaneously transmitting downlink communications to a UE 115-*b* (e.g., via the communication link 210-*a*). In such an example, the full-duplex communications at the network entity 105-*a* may lead to self-interference 220-*a*. Additionally, or alternatively, the network entity 105-*a* and the network entity 105-*b* (e.g., neighboring network entities) may concurrently perform full-duplex communications, such that downlink signals transmitted by the network entity 105-*b* may overlap with uplink signals received by the network entity 105-*a*, leading to CLI 215-*b*.

Additionally, or alternatively, the UE 115-*a* and the UE 115-*b* (e.g., neighboring UEs) may concurrently perform half-duplex TDD communications such that uplink signals transmitted by the UE 115-*b* may overlap with downlink signals received by the UE 115-*a*, which may lead to CLI 215-*a*. In some examples, the UE 115-*a* may be operating in a cell different from the cell in which the UE 115-*b* may be operating. For example, the UE 115-*a* and the UE 115-*b* may be operating in adjacent cells. In an example, the CLI 215-*a* may be an example of inter-cell CLI. Additionally, or alternatively, the network entity 105-*b* may perform full-duplex communications concurrently with the network entity 105-*a*. In such an example, downlink communications transmitted by the network entity 105-*b* may lead to inter-cell interference at the UE 115-*b*. For example, the downlink communications transmitted by the network entity 105-*b* (e.g., to another UE (not shown)) may interfere with downlink communications received the UE 115-*b* (e.g., from the network entity 105-*a*).

In some other examples, the UE 115-*a* and the UE 115-*b* may be operating in a same cell. In such an example, the CLI 215-*a* may be an example of intra-cell CLI. For example, the network entity 105-*a* may be operating in a full-duplex mode (e.g., in SBFD), such that the network entity 105-*a* may configure downlink communications for the UE 115-*a* in frequency domain resources adjacent to the frequency domain resources allocated for uplink communications from the UE 115-*b*. For example, the network entity 105-*a* may configure the UE 115-*b* to receive downlink data 235 (e.g., from the network entity 105-*a*) in the time domain resource 230-*b* and in the downlink radio frequency band 250 and the UE 115-*a* may be configured to transmit uplink data 240 in the time domain resource 230-*b* in the uplink radio frequency band 255 (e.g., the adjacent frequency resources). In such an example, the uplink communications transmitted by the UE 115-*a* may interfere with the downlink communications received at the UE 115-*b*.

In the example of FIG. 2B, the network entity 105-*c* and the UE 115-*c* may each be operating in a full-duplex mode (e.g., MDF), such that the UE 115-*c* may receive downlink communications from the network entity 105-*c* via the communication link 210-*b*, while simultaneously transmitting uplink communications to the network entity 105-*c* via the communication link 205-*c*. In such an example, the full-duplex communications at the network entity 105-*c* and the full-duplex communications at the UE 115-*c* may lead to self-interference 220-*b* and self-interference 220-*c*, respectively. In some examples of the wireless communications system 200-*b*, the UE 115-*c* and the UE 115-*d* may each be operating in a multiple transmission and reception mode. In such an example, downlink communications and uplink communications performed by the network entity 105-*c* may occur at two different antenna panels located at two transmission and reception points. For example, the reception of uplink communications from the UE 115-*c* a may occur at an antenna panel of a first transmission and reception point and the transmission of downlink communications to the UE 115-*c* may occur at an antenna panel of a second transmission and reception point. In some other examples, reception of the uplink communications and transmission of the downlink communications may occur at two co-located antenna panels of the network entity 105-*c* (e.g., a single base station).

In the example of FIG. 2C, the UE 115-*e* may be operating in a full-duplex mode (e.g., SBFD), such that the UE 115-*e* may receive downlink communications from the network entity 105-*f* via the communication link 210-*d*, while simultaneously transmitting uplink communications to the network entity 105-*e* via the communication link 205-*d*. In such an example, the full-duplex communications at the UE 115-*e* may lead to self-interference 220-*d*. In some examples of the wireless communications system 200-*c*, the network entity 105-*e* and the network entity 105-*f* may be examples of transmission and reception points and the UE 115-*e* (e.g., and the UE 115-*f*) may be operating in a multiple transmission and reception mode. In such an example, the uplink communications transmitted from the UE 115-*e* may lead to CLI 215-*e* (e.g., intra-cell CLI) at the UE 115-*f*.

Accordingly, the wireless communications systems 200 may support CLI mitigation in full-duplex networks in accordance with techniques described herein. For example, described with reference to FIG. 2A, the UE 115-*a* may receive, from the network entity 105-*a*, an uplink grant scheduling an uplink message. Additionally, the uplink grant may indicate for the UE 115-*a* to separately encode and precode a first portion of the uplink message, which may be referred to a message portion 260-*a*, and a second portion of the message, which may be referred to as a message portion 260-*b*, to support interference mitigation at the UE 115-*b*. That is, the uplink grant may include an indication for the UE 115-*a* to perform rate matching.

As such, the UE 115-*a* may split the uplink message into the message portion 260-*a* and the message portion 260-*b* and encode each message portion 260 according to respective MCSs. For example, the UE 115-*a* may encode the message portion 260-*a* according to a first MCS and the message portion 260-*b* according to a second MCS. Additionally, the UE 115-*a* may precode each encoded message portion 260 according to respective precoding matrices. For example, the UE 115-*a* may encode the message portion 260-*a* according to a first precoding matrix and the message portion 260-*b* according to a second precoding matrix. The first precoding matrix may be based on the communication link 205-*a* between the UE 115-*a* and the network entity 105-*a* and the second precoding matrix may be based on the communication link 205-*a* and a communication link 265 (e.g., an example of a D2D communication link 135) between the UE 115-*a* and the UE 115-*b*.

The UE 115-*a* may transmit the message portion 260-*a* (e.g., encoded and precoded message portion 260-*a*) via a first beam and the message portion 26-*b* (e.g., encoded and precoded) via a second beam. As such, the network entity 105-*a* may receive the message portion 260-*a* and the message portion 260-*b* and decode each message portion 260 to obtain information associated with the uplink message scheduled by the uplink grant. Additionally, the UE 115-*b* may receive the message portion 260-*a* and the message portion 260-*b*. In some cases, the UE 115-*b* may treat the message portion 260-*a* as noise (e.g., ignore the message portion 260-*a* or refrain from decoding the message portion 260-*a*) and may decode the message portion 260-*b* to support interference mitigation at the UE 115-*b*. That is, the UE 115-*b* may perform an interference mitigation procedure (e.g., successive interference cancelation (SIC)) based on decoding the message portion 260-*b*, such that the UE 115-*b* may receive the downlink message 245.

Figure 3A:
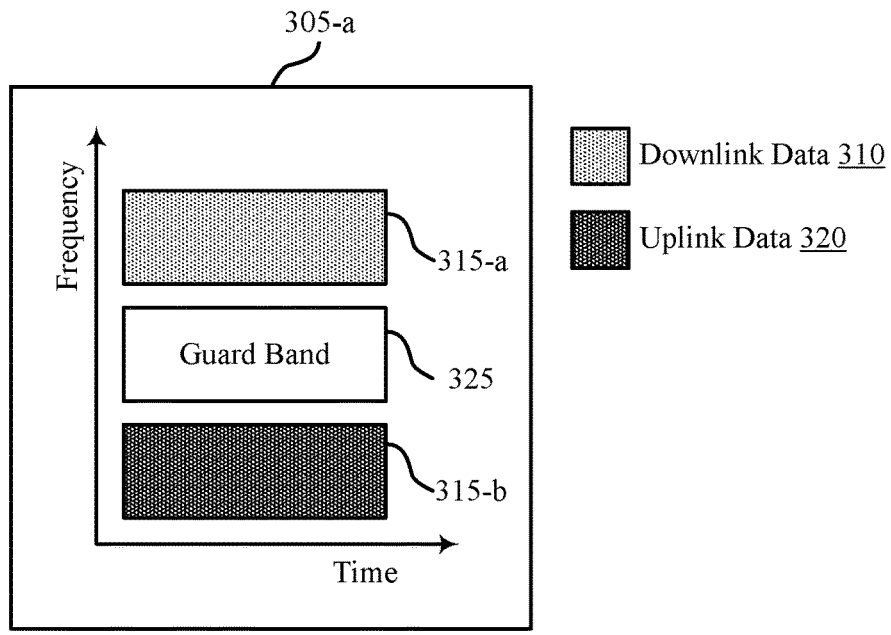
FIGS. 3A and 3B each illustrate examples of a full-duplex operation scheme that supports CLI mitigation in full-duplex networks in accordance with one or more aspects of the present disclosure.
Figure 3B:
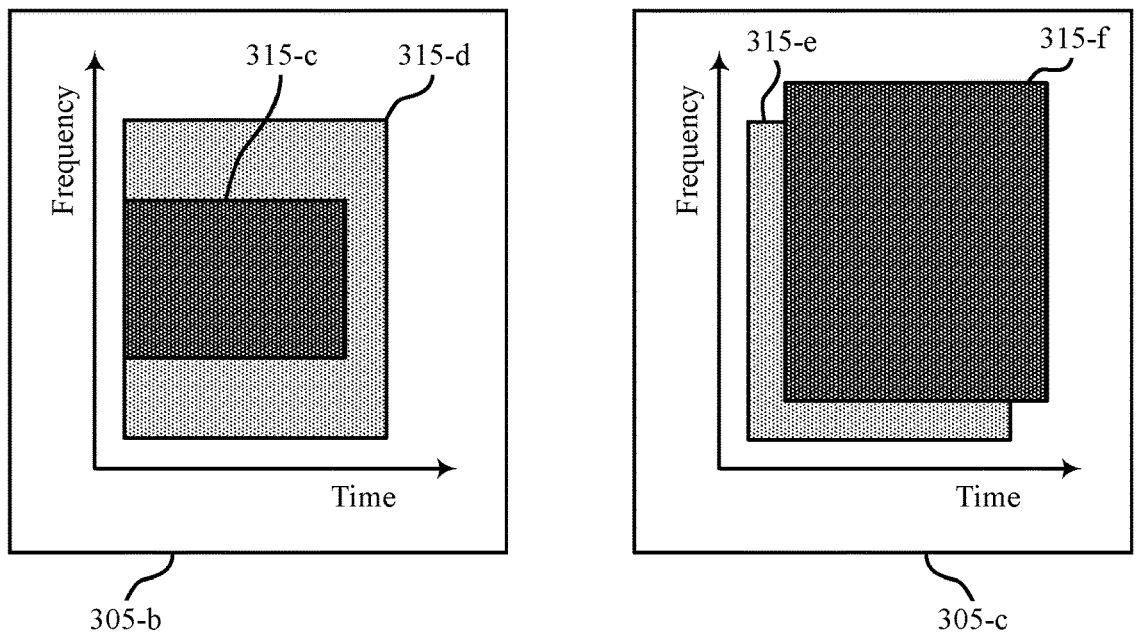

FIGS. 3A and 3B each illustrate an example of a full-duplex operation scheme 300 that supports CLI mitigation in full-duplex networks in accordance with one or more aspects of the present disclosure. In some examples, the full-duplex operation schemes 300 (a full-duplex operation scheme 300-*a* and a full-duplex operation scheme 300-*b*) may implement or be implemented by aspects of the wireless communications system 100. For example, the full-duplex operation schemes 300 may each be implemented by a network entity 105 or a UE 115, which may be examples of the corresponding devices as described with reference to FIG. 1. In some examples of FIGS. 3A and 3B, the network entity 105 may be an example of a CU 160, a DU 165, an RU 170, a base station 140, an IAB node 104, or one or more other network nodes as described with reference to FIG. 1. The full-duplex operation schemes 300 may include features for improved communications between the UE 115 and the network entity 105, among other benefits.

In some examples, a wireless communications device (e.g., the network entity 105 or the UE 115) may support full-duplex communications, in which the communication device may transmit and receive communication simultaneously, thereby promoting latency savings enabled by receiving downlink signal in uplink slots (or symbols). In some examples, the communication device may support multiple (e.g., two) types of full-duplex operations. For example, the communication device may support SBFD operations, in which the communication device may transmit and receive communications over a same time resource and on different frequency resources. That is, the downlink resources may be separated from the uplink resource in the frequency domain.

For example, as illustrated by the example of FIG. 3A, the network entity 105 may configure one or more UEs 115 in accordance with the configuration 305-a. In such an example, the network entity 105 may configure downlink transmissions (e.g., transmissions of downlink data 310) for the UE 115 in frequency domain resources (e.g., a resource 315-a) that may be adjacent to frequency domain resources (e.g., a resource 315-b) configured for uplink transmission (e.g., transmissions of uplink data 320) of another UE. In some examples, to reduce interference between the uplink transmissions (e.g., scheduled for the resource 315-a) and the downlink transmissions (e.g., scheduled for the resource 315-b), the network entity 105 may configure the resource 315-a and the resource 315-b to be separated by a guard band 325.

Additionally, or alternatively, as illustrated in the example of FIG. 3B, the network entity 105 (e.g., the network entity 105 entity) may support IBFD operations, such that the network entity 105 entity may transmit and receive communications on a same time resource and a same frequency resource (e.g., a same slot and carrier bandwidth). For example, the network entity 105 may configure one or more UEs 115 in accordance with the configuration 305-b, the configuration 305-c, or both. In such an example, the network entity 105 may configure downlink transmissions (e.g., transmission of the downlink data 310) and the uplink transmissions (e.g., transmission of the uplink data 320), such that the downlink transmission and the uplink transmissions may share a same one or more time and frequency resources (e.g., IBFD time and frequency resources). In some examples, the network entity 105 may configure one or more UEs 115 in accordance with the configuration 305-b, such that one or more time and frequency resources allocated for transmission of the uplink data 320 (e.g., a resource 315-c) may overlap (e.g., fully overlap) with one or more time and frequency resources allocated for transmission of the downlink data 310 (e.g., a resource 315-d). Additionally, or alternatively, the network entity 105 may configure one or more UEs 115 in accordance with the configuration 305-c, such that a portion of the one or more time and frequency resources allocated for transmission of the uplink data 320 (e.g., a resource 315-e) may overlap with a portion of the one or more time and frequency resources allocated for transmission of the downlink data 310 (e.g., a resource 315-f). That is, the resource 315-e) may partially overlap with the resource 315-f.

In some examples, while full-duplex communications may provide for one or more spectrum efficiency enhancements (e.g., per cell or per UE 115), efficient resource utilization, and coverage area extension, concurrent full-duplex communications performed by neighboring communication devices may lead to CLI. For example, neighboring communication devices may perform full-duplex communications concurrently, such that communications received by a first communication device may overlap in time with communications transmitted by a second communication device (e.g., a neighboring communication device). In such an example, the communications transmitted by the second communication device may lead to CLI at the first communication device.

In some examples, to reduce the effects of CLI, the network entity 105 may employ one or more interference mitigation techniques. For example, a first UE 115 may receive, from a network entity 105, an uplink grant scheduling an uplink message and may split the uplink message into a first portion of the uplink message and the second portion of the uplink message. Further, the first UE 115 may separately encode each portion of the uplink message according to respective MCSs and separately precode each portion of the uplink message according to respective precoding matrices. For example, a first MCS and a first precoding matrix associated with the first portion of the uplink message may be based on a first communication link 125 between the first UE 115 and the network entity 105. Additionally, a second MCS and a second precoding matrix associated with the second portion of the uplink message may be based on the first communication link 125 and a second communication link 125 between the first UE 115 and a second UE 115, where uplink messages transmitted by the first UE 115 result in interference at the second UE 115. As such, the network entity 105 may decode the first portion of the uplink message and the second portion of the uplink message to receive the uplink message from the first UE 115 and the second UE 115 may decode the second portion of the uplink message and treat the second portion of the uplink message as noise. Thus, the second UE 115 may perform interference mitigation and decode a downlink message transmitted by the network entity 105 based on decoding the second portion of the uplink message.

Figure 4:
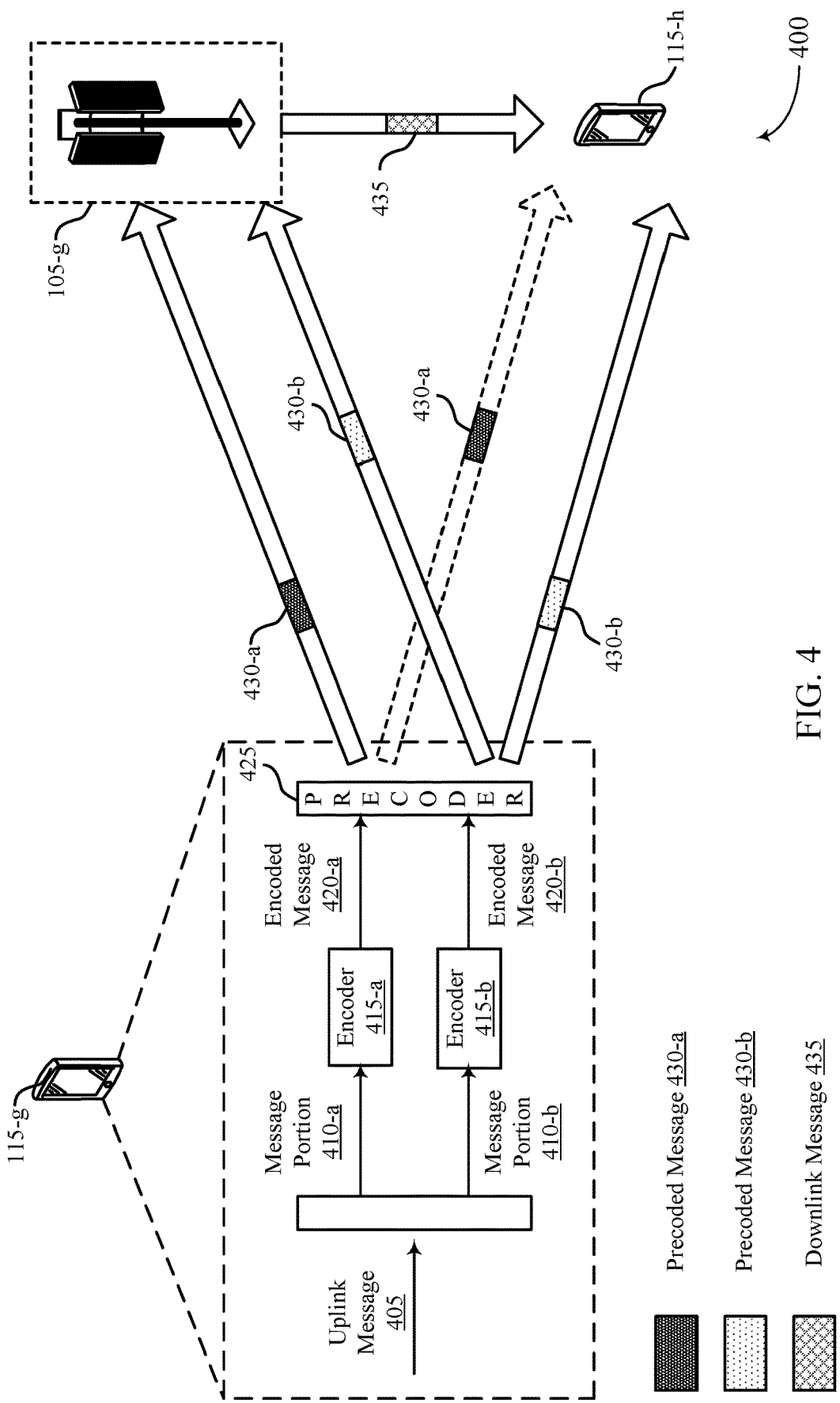
FIG. 4 illustrates an example of a wireless communications system that supports CLI mitigation in full-duplex networks in accordance with one or more aspects of the present disclosure.

FIG. 4 illustrates an example of a wireless communications system 400 that supports CLI mitigation in full-duplex networks in accordance with one or more aspects of the present disclosure. In some examples, the wireless communications system 400 may implement or be implemented by aspects of the wireless communications system 100, the wireless communications systems 200 and the full-duplex operations schemes 300. For example, the wireless communications systems 400 may each include one or more network entities 105 (e.g., a network entity 105-g) and one or more UEs 115 (e.g., a UE 115-g and a UE 115-h), which may be examples of the corresponding devices as described with reference to FIG. 1. In the example of FIG. 4, the network entities 105 may be examples of a CU 160, a DU 165, an RU 170, a base station 140, an IAB node 104, or one or more other network nodes as described with reference to FIG. 1.

In some examples, the wireless communications system 200 may support full-duplex operations such that the network entity 105-g may simultaneously receive uplink messages 405 (e.g., from the UE 115-g) and transmit downlink messages 435 (e.g., to the UE 115-h). In such examples, the uplink message 405 transmitted by the UE 115-g (e.g., an aggressor UE 115) may cause interference (e.g., CLI) with the downlink message 435 received by the UE 115-h (e.g., a victim UE 115).

As such, the wireless communications system 400 may support CLI interference mitigation (e.g., via rate matching). For example, the UE 115-g may receive, from the network entity 105-g, an uplink grant scheduling an uplink message 405, where the uplink grant indicates for the UE 115-g to apply rate splitting to the uplink message 405. That is, the uplink grant may include an indication to separately encode and precode a first portion of the uplink message 405, which may be referred to as a message portion 410-a, and a second portion of the uplink message 405, which may be referred to as a message portion 410-*b*. As such, the UE 115-*g* may split the uplink message 405 into the message portion 410-*a* and the message portion 410-*b*.

In some examples, the UE 115-*g* may split the uplink message 405 into the message portion 410-*a* and the message portion 410-*b* according to a percentage or quantity (e.g., number) of bits. For example, the network entity 105-*g* may transmit, to the UE 115-*g*, a control message (e.g., an RRC message) indicating a first quantity of bits associated with the message portion 410-*a* (e.g., a first level) and a second quantity of bits associated with the message portion 410-*b* (e.g., a second level). Additionally, or alternatively, the control message may indicate a percentage associated with the split of the uplink message 405 into the message portion 410-*a* and the message portion 410-*b* (e.g., for time or frequency allocation). For example, the UE 115-*g* may receive (e.g., via RRC message or dynamic indication) an indication of a percentage, or ratio, of bits associated with the message portion 410-*a* to bits associated with the message portion 410-*b*. In some cases (e.g., available information bits in the message portion 410-*a* is less than the indicated first quantity or available information bits in the message portion 410-*b* is less than the indicated second quantity), the UE 115-*g* may append zeros to the message portion 410-*a* or the message portion 410-*b*.

Additionally, the UE 115-*g* may encode and modulate the message portion 410-*a* and the message portion 410-*b* separately, or according to respective (e.g., different) MCSs. For example, the UE 115-*g* may encode and modulate the message portion 410-*a* according to a first MCS via the encoder 415-*a* to generate an encoded message 420-*a* (e.g., a first codeword) and may encode and modulate the message portion 410-*b* according to a second MCS via the encoder 415-*b* to generate an encoded message 420-*b* (e.g., a second codeword). In some cases, the network entity 105-*g* may transmit, to the UE 115-*g*, an indication of the first MCS, the second MCS, or both.

Additionally, the UE 115-*g* may precode (e.g., via a precoder 425) the encoded message 420-*a* and the encoded message 420-*b* separately (e.g., independently), or according to respective (e.g., different) precoding matrices (e.g., precoders). For example, the UE 115-*g* may precode the encoded message 420-*a* according to a first precoding matrix to generate the precoded message 430-*a* and may precode the encoded message 420-*b* according to a second precoding matrix to generate the precoded message 430-*b*. In some cases, the first precoding matrix may be based on a first communication link between the UE 115-*g* and the network entity 105-*g* (e.g., such that the network entity 105-*g* may decode the encoded message 420-*a*) and the second precoding matrix may be based on the first communication link and a second communication link between the UE 115-*g* and the UE 115-*h* (e.g., such that the network entity 105-*g* and the UE 115-*h* may decode the encoded message 420-*b*). Thus, for example, the first precoding matrix may not be based on (e.g., may be independent of) the second communication link between the UE 115-*g* and the UE 115-*h*. For example, the first precoding matrix may be based on a first set of one or more channel metrics associated with the first communication link, and the second precoding matrix may be based on the first set of one or more channel metrics and a second set of one or more channel metrics associated with the second communication link (e.g., where the first precoding matrix is not based on—e.g., is independent of—the second set of one or more channel metrics).

In some examples, the network entity 105-*g* may transmit an indication of the first precoding matrix, the second precoding matrix, or both, in the uplink grant (e.g., dynamically). In such cases, the UE 115-*g* may transmit, to the network entity 105-*g*, an indication of one or more parameters (e.g., channel metrics) associated with the second communication link between the UE 115-*g* and the UE 115-*h*, such that the network entity 105-*g* may select the first precoding matrix (e.g., that fits the first communication link) and the second precoding matrix (e.g., that fits the first communication link and the second communication link).

Additionally, or alternatively, the UE 115-*g* may select (e.g., implicitly) the first precoding matrix, the second precoding matrix, or both (e.g., to fit the network entity 105-*g* and the UE 115-*h*). That is, the UE 115-*g* may select the first precoding matrix associated with (e.g., for) the encoded message 420-*a* based on the first communication link, such that the network entity 105-*g* may decode the precoded message 430-*a* (e.g., generated by applying the first precoding matrix to the encoded message 420-*a*). Additionally, the UE 115-*g* may select the second precoding matrix associated with (e.g., for) the encoded message 420-*b* based on the first communication link and the second communication link, such that the network entity 105-*g* and the UE 115-*h* may decode the precoded message 430-*b* (e.g., generated by applying the second precoding matrix to the encoded message 420-*b*).

In some cases, the UE 115-*g* may transmit (e.g., to the network entity 105-*g*) a summation of the precoded message 430-*a* and the precoded message 430-*b*. That is, the UE 115-*g* may transmit the precoded message 430-*a* via a first beam (e.g., associated with the first precoding matrix) and the precoded message 430-*b* via a second beam (e.g., associated with the second precoding matrix). The network entity 105-*g* may receive the precoded message 430-*a* and the precoded message 430-*b* and decode each precoded message 430-*a* to obtain information associated with the uplink message 405 (e.g., scheduled by the uplink grant).

In some cases, the UE 115-*h* may receive the precoded message 430-*a* and the precoded message 430-*b* (e.g., as interference). Additionally, the UE 115-*h* may receive the downlink message 435. That is, the UE 115-*h* may receive a summation of the downlink message 435, the precoded message 430-*a*, and the precoded message 430-*b*, which may be illustrated according to the following Equation 1:

$$\text{Received Signal} = H_D X_D + H_1 P_1 X_1 + H_2 P_2 X_2 \tag{1}$$

where the parameter $H_D$ may be a channel matrix that represents a downlink channel between the network entity 105-*g* and the UE 115-*h*, the parameter $X_D$ may represent a downlink signal associated with the downlink message 435, the parameter $H_1$ may be a channel matrix that represents a first channel between the UE 115-*g* and the network entity 105-*g*, the parameter $P_1$ may represent the first precoding matrix, the parameter $X_1$ may represent a signal associated with the precoded message 430-*a*, the parameter $H_2$ may be a channel matrix that represents a second channel between the UE 115-*g* and the UE 115-*h*, the parameter $P_2$ may represent the second precoding matrix, and the parameter $X_2$ may represent a signal associated with the precoded message 430-*b*.

In such cases, the UE 115-*h* may decode the precoded message 430-*b* (e.g., $H_2 P_2 X_2$) and perform an interference mitigation procedure (e.g., SIC) based on decoding the precoded message 430-*b*. That is, the UE 115-*h* may perform the interference mitigation procedure to remove the precoded message 430-*b* (e.g., part of the interference) from the received signal. Additionally, the UE 115-*a* may treat the precoded message 430-*a* (e.g., $H_1 P_1 X_1$, rest of the interference) as noise. As such, the UE 115-*h* may decode the downlink message 435 (e.g., $H_D X_D$) based on decoding the precoded message 430-*b* (e.g., partially decoding the interference) and performing the interference mitigation procedure.

In some cases, the UE 115-*h* may decode the precoded message 430-*b* based on one or more transmission parameter associated with the precoded message 430-*b*, which may include the second MCS, the second precoding matrix, time resources associated with the precoded message 430-*b*, frequency resources associated with the precoded message 430-*b*, or any combination thereof. In some examples, the UE 115-*g* may transmit, to the UE 115-*h*, an indication of the second MCS, the second precoding matrix, time resources associated with the precoded message 430-*b*, frequency resources associated with the precoded message 430-*b*, or any combination thereof. Additionally, or alternatively, the network entity 105-*g* may transmit, to the UE 115-*h*, an indication of the second MCS, the second precoding matrix, time resources associated with the precoded message 430-*b*, frequency resources associated with the precoded message 430-*b*, or any combination thereof.

In some cases, the decoding of the precoded message 430-*a* (e.g., partial or full decoding of the interference at the UE 115-*h*) may result in a delay to a processing timeline at the UE 115-*h*. That is, the decoding of the precoded message 430-*a* may delay the decoding of the downlink message 435 (e.g., which may delay further operations or functions performed by the UE 115-*h*). As such, the network entity 105-*g* may transmit, to the UE 115-*h*, an indication of a processing delay. That is, the network entity 105-*g* may configure the UE 115-*h* with a delay to the processing timeline of the UE 115-*h* such that that the UE 115-*h* may decode the precoded message 430-*a*.

In some examples (e.g., if channel quality allows), the UE 115-*g* may split the uplink message 405 such that the message portion 410-*a* contains none of the uplink message 405 (e.g., 0%) and the message portion 410-*b* contains all of the uplink message 405 (e.g., 100%). That is, the UE 115-*g* may encode the uplink message 405 (e.g., the message portion 410-*b* in this example) via the encoder 415-*b* using the second MCS and precode the uplink message 405 (e.g., the encoded message 420-*b* in this example) via the precoder 425 using the second precoding matrix, such that the UE 115-*h* may decode the uplink message 405 (e.g., the precoded message 430-*b* in this example). That is, the UE 115-*h* may fully decode interference (e.g., the uplink message 405) from the UE 115-*g*.

In some cases, the network entity 105-*g* may transmit the uplink grant indicating for the UE 115-*g* to separately encode and precode the message portion 410-*a* and the message portion 410-*b* based on a security agreement between the UE 115-*g* and the UE 115-*h* (e.g., the UE 115-*g*, which may be a user phone, and the UE 115-*h*, which may be a laptop, are associated with the same user). For example, the UE 115-*g*, the UE 115-*h*, or both, may transmit, to the network entity 105-*g*, an indication of the security agreement between the UE 115-*g* and the UE 115-*h* and the network entity 105-*g* may transmit the uplink grant based on the indication of the security agreement.

While much of the present disclosure is described in the context of the UE 115-*g* splitting the uplink message 405 into the message portion 410-*a* and the message portion 410-*b*, this is not to be regarded as a limitation of the present disclosure. Indeed, it is contemplated herein that the UE 115-*g* may split the uplink message 405 into two message portions 410. In this regard, any quantity of message portions 410 may be considered with reference to the techniques described herein.

Figure 5:
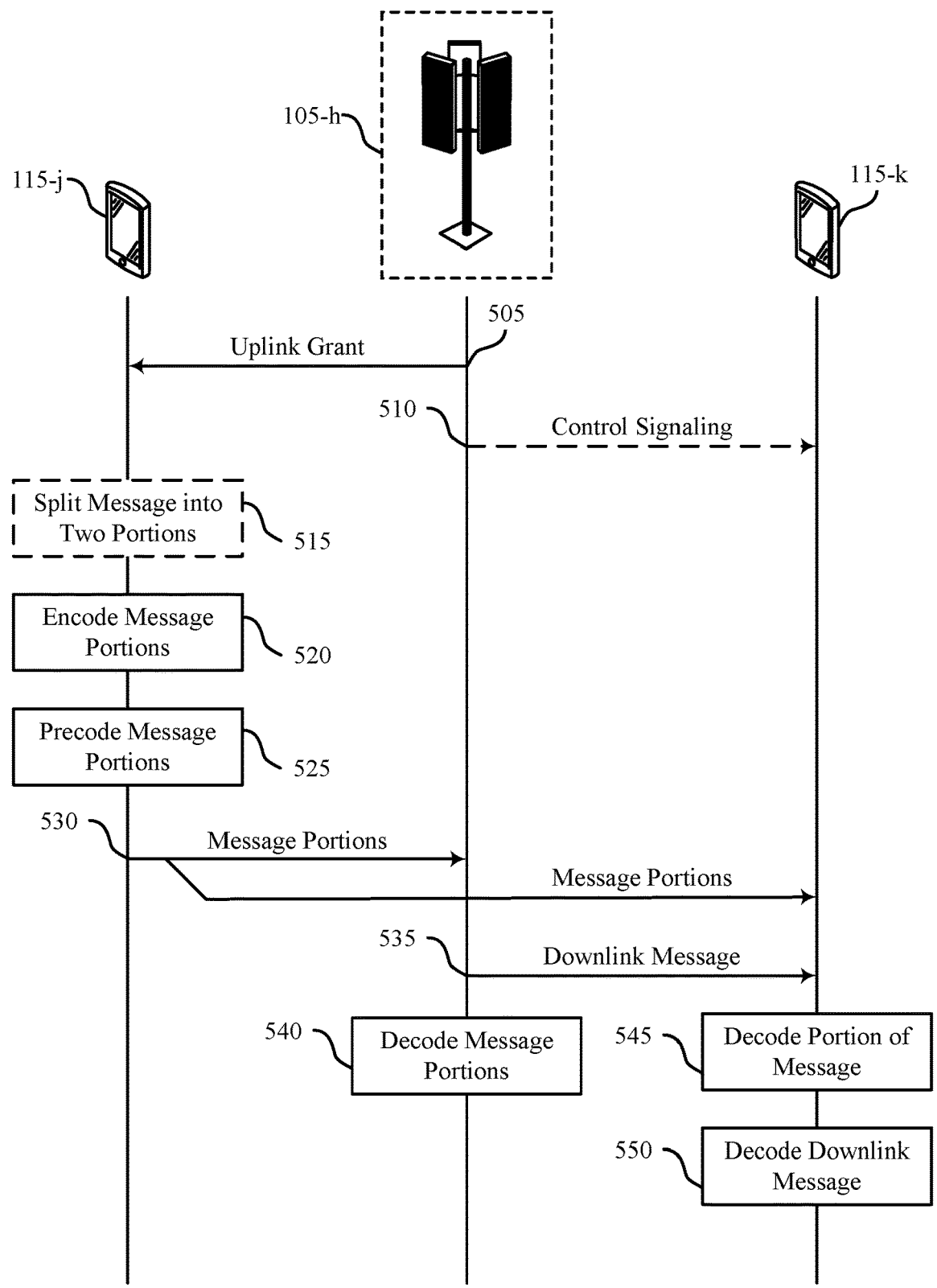
FIG. 5 illustrates an example of a process flow that supports CLI mitigation in full-duplex networks in accordance with one or more aspects of the present disclosure.

FIG. 5 illustrates an example of a process flow 500 that supports CLI mitigation in full-duplex networks in accordance with one or more aspects of the present disclosure. In some examples, the process flow 500 may implement or be implemented by aspects of the wireless communications system 100, the wireless communications systems 200, the full-duplex operations schemes 300, and the wireless communications system 400. For example, the process flow 500 may each include one or more network entities 105 (e.g., a network entity 105-*h*) and one or more UEs 115 (e.g., a UE 115-*j* and a UE 115-*k*), which may be examples of the corresponding devices as described with reference to FIG. 1. In the example of FIG. 5, the network entities 105 may be examples of a CU 160, a DU 165, an RU 170, a base station 140, an IAB node 104, or one or more other network nodes as described with reference to FIG. 1. In some examples, the UE 115-*k* may perform an interference mitigation procedure based on decoding a portion of an uplink message transmitted by the UE 115-*j*.

At 505, the network entity 105-*h* may transmit, to the UE 115-*j*, control signaling including an uplink grant that schedules an uplink message, where the uplink grant includes an indication to separately encode and precode a first portion of the uplink message and a second portion of the uplink message (e.g., the uplink grant is configured for rate splitting). In some cases, the uplink grant may include an indication of a first set of one or more parameters associated with separately encoding and precoding the first portion of the uplink message and the second portion of the uplink message. For example, the first set of one or more parameters may include one or more precoding matrices, one or more sets of time resources and frequency resources, one or more MCS, or any combination thereof. In some cases, the first set of one or more parameters may be based on a first communication link between the UE 115-*j* and the network entity 105-*h*, a second communication link between the UE 115-*j* and the UE 115-*h*, or both. In such cases, the UE 115-*j* may transit, to the network entity 105-*h*, an indication of one or more parameters associated with the second communicating link between the UE 115-*j* and the UE 115-*k*.

In some examples, the network entity 105-*h* may transmit the uplink grant based on a security agreement between the UE 115-*j* and the UE 115-*k*. That is, the UE 115-*j*, the UE 115-*k*, or both, may transmit, to the network entity 105-*h*, an indication of the security agreement between the UE 115-*j* and the UE 115-*k*.

In some cases, at 510, the network entity 105-*h* may transmit, to the UE 115-*k*, control signaling indicating a second set one or more parameters associated with separately encoding and precoding the first portion of the uplink message and the second portion of the uplink message. For example, the second set of one or more parameters may include the one or more precoding matrices, the one or more sets of time resources and frequency resources for transmitting the uplink message, the one or more MCS, a processing delay, or any combination thereof. Additionally, or alternatively, the UE 115-*k* may receive the control signaling indicating the second set one or more parameters associated with separately encoding and precoding the first portion of the uplink message and the second portion of the uplink message from the UE 115-*j*.

In some cases, at 515, the UE 115-*j* may split the uplink message into two portions, generating the first portion of the uplink message and the second portion of the uplink message. In some cases, the UE 115-$j$ may split the uplink message based on one or more parameters associated with splitting the message into the first portion of the message and the second portion of the message. That is, the UE 115-$j$ may receive control signaling indicating the one or more parameters associated with splitting the message into the first portion of the message and the second portion of the message. In some cases, the one or more parameters may include a percentage of bits allocated to the first portion of the uplink message, a percentage of bits allocated to the second portion of the uplink message, or both. Additionally, or alternatively, the one or more parameters may include a quantity of bits allocated to the first portion of the uplink message, a quantity of bits allocated to the second portion of the uplink message, or both.

At 520, the UE 115-$j$ may encode the first portion of the uplink message according to a first MCS and a second portion of the message according to a second MCS. In some cases, the first MCS, the second MCS, or both may be based on the one or more parameters included in the uplink grant.

At 525, the UE 115-$j$ may precode the first portion of the message using a first precoding matrix and the second portion of the message using a second precoding matrix. In such cases, the first precoding matrix may be based on a first communication link between the UE 115-$j$ and the network entity 105-$h$ and the second precoding matrix may be based on the first communication link and a second communication link between the UE 115-$j$ and the UE 115-$h$. That is, the UE 115-$j$ may select the first precoding matrix based on a first set of one or more channel metrics associated with the first communication link and may select the second precoding matrix based on the first set of one or more channel metrics associated with the first communication link and a second set of one or more channel metrics associated with the second communication link. Selection by the UE 115-$j$ of the first precoding matrix may not be based on (e.g., may be independent of) the second set of one or more channel metrics. Additionally, or alternatively, the first precoding matrix, the second precoding matrix, or both, may be based on the one or more parameters included in the uplink grant.

At 530, the UE 115-$j$ may transmit the first portion of the uplink message via a first beam associated with the first precoding matrix and the second portion of the uplink message via a second beam associated with the second precoding matrix. Additionally, the UE 115-$j$ may transmit the first portion of the uplink message and the second portion of the uplink message are transmitted according to the uplink grant. As such, the network entity 105-$h$ may receive the first portion of the uplink message via the first beam associated with the first precoding matrix and the second portion of the uplink message via the second beam associated with the second precoding matrix. Additionally, the UE 115-$k$ may receive the second portion of the uplink message via the second beam, where the uplink message creates interference with a downlink message received from the network entity 105-$h$, at 535.

At 540, the network entity 105-$h$ may decode the first portion of the uplink message and the second portion of the uplink message to obtain information associated with the uplink message scheduled by the uplink grant.

At 545, the UE 115-$k$ may decode the second portion of the uplink message based on the second set of one or more parameters associated with separately encoding and precoding the first portion of the uplink message and the second portion of the uplink message. In particular, the UE 115-$k$ may decode the second portion of the uplink message based on the second MCS, the second precoding matrix, a set of time resources and frequency resources used to transmit the second portion of the uplink message, or any combination thereof.

At 550, the UE 115-$k$ may decode the downlink message based on decoding the second portion of the uplink message. In some cases, the UE 115-$k$ may decode the downlink message based on performing an interference cancellation procedure, where the interference cancellation procedure is based on decoding the second portion of the uplink message.

Figure 6:
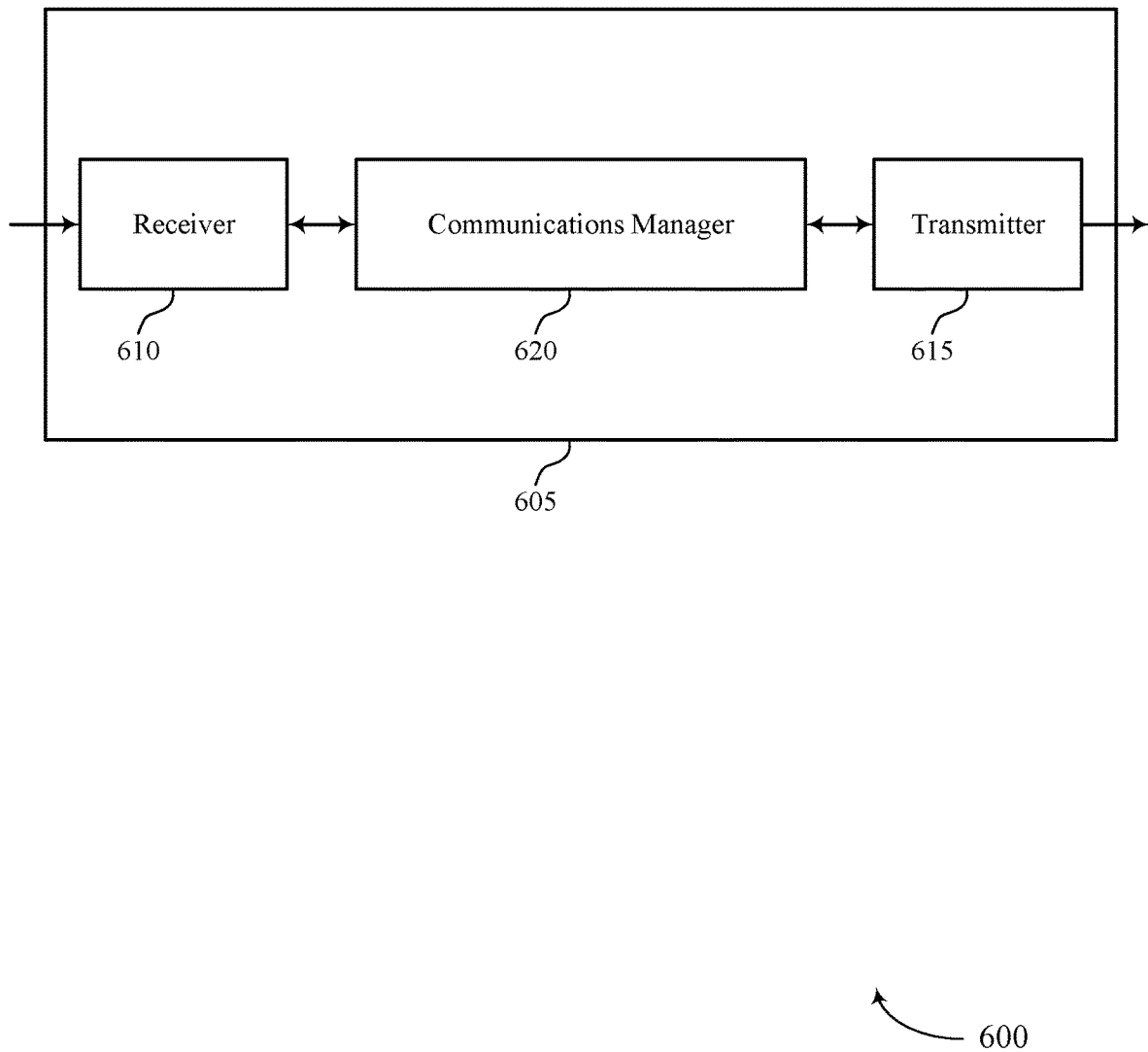
FIGS. 6 and 7 show block diagrams of devices that support CLI mitigation in full-duplex networks in accordance with one or more aspects of the present disclosure.

FIG. 6 shows a block diagram 600 of a device 605 that supports CLI mitigation in full-duplex networks in accordance with one or more aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to CLI mitigation in full-duplex networks). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to CLI mitigation in full-duplex networks). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of CLI mitigation in full-duplex networks as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications at a first UE in accordance with examples as disclosed herein. For example, the communications manager 620 may be configured as or otherwise support a means for encoding a first portion of a message according to a first MCS and a second portion of the message according to a second MCS, where the message is scheduled by an uplink grant. The communications manager 620 may be configured as or otherwise support a means for precoding the first portion of the message using a first precoding matrix and the second portion of the message using a second precoding matrix, where the first precoding matrix is based on a first communication link between the first UE and a network entity, and where the second precoding matrix is based on the first communication link and a second communication link between the first UE and a second UE. For example, unlike the second precoding matrix, the first precoding matrix may not be based on a second communication link between the first UE and a second UE (e.g., may be independent of the second communication link between the first UE and the second UE). The communications manager 620 may be configured as or otherwise support a means for transmitting the first portion of the message via a first beam associated with the first precoding matrix and the second portion of the message via a second beam associated with the second precoding matrix, where the first portion of the message and the second portion of the message are transmitted according to the uplink grant.

Additionally, or alternatively, the communications manager 620 may support wireless communications at a first UE in accordance with examples as disclosed herein. For example, the communications manager 620 may be configured as or otherwise support a means for receiving, from a second UE, a portion of a first message via a first beam, where the first message is associated with (e.g., creates) interference with a second message received from a network entity. The communications manager 620 may be configured as or otherwise support a means for decoding the portion of the first message, where decoding the portion of the first message is based on one or more parameters associated with the portion of the first message. The communications manager 620 may be configured as or otherwise support a means for decoding the second message based on decoding the portion of the first message.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for CLI mitigation in full-duplex operations which may result in reduced processing, reduced power consumption, and more efficient utilization of communication resources, among other advantages.

Figure 7:
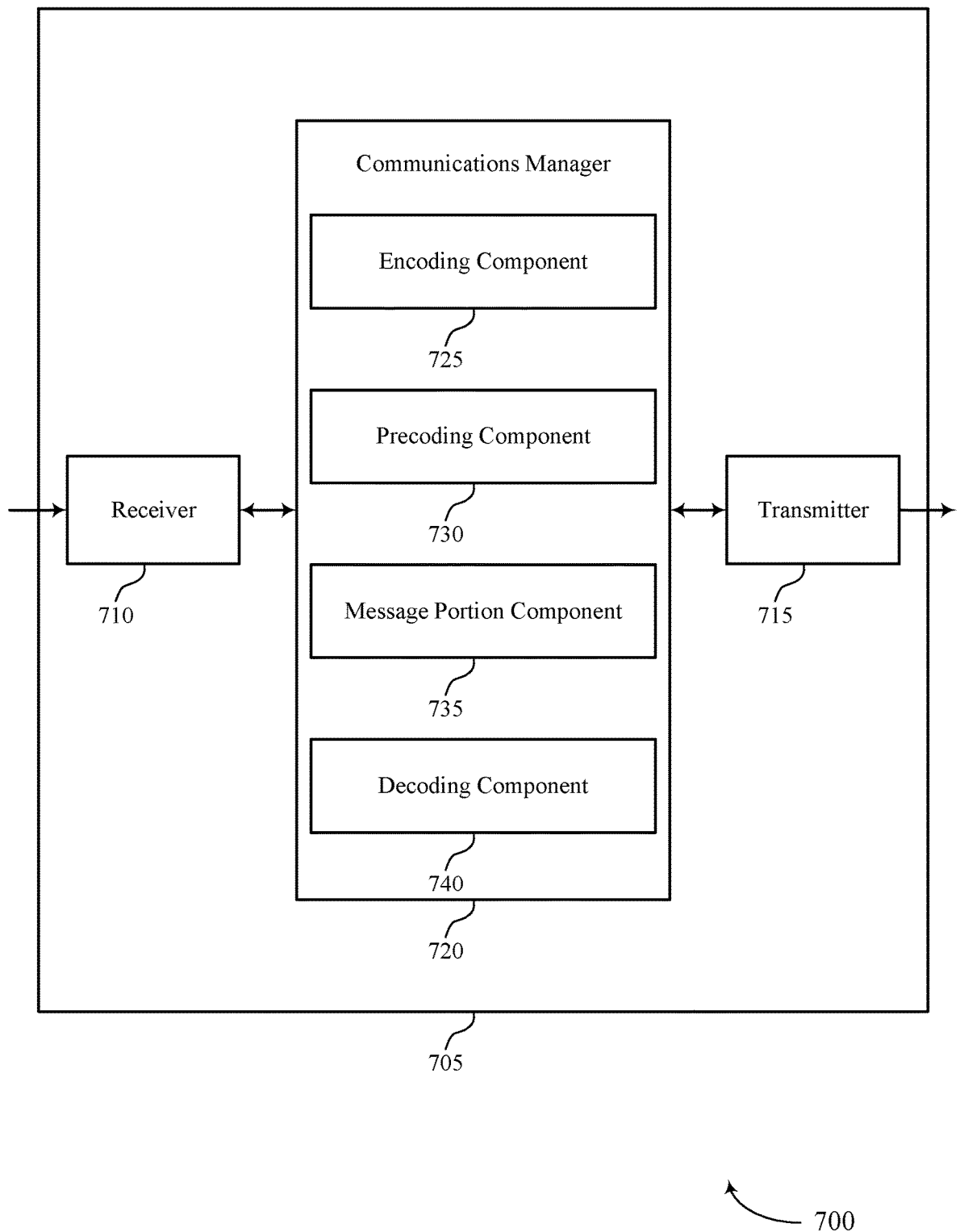

FIG. 7 shows a block diagram 700 of a device 705 that supports CLI mitigation in full-duplex networks in accordance with one or more aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to CLI mitigation in full-duplex networks). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to CLI mitigation in full-duplex networks). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of CLI mitigation in full-duplex networks as described herein. For example, the communications manager 720 may include an encoding component 725, a precoding component 730, a message portion component 735, a decoding component 740, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications at a first UE in accordance with examples as disclosed herein. The encoding component 725 may be configured as or otherwise support a means for encoding a first portion of a message according to a first MCS and a second portion of the message according to a second MCS, where the message is scheduled by an uplink grant. The precoding component 730 may be configured as or otherwise support a means for precoding the first portion of the message using a first precoding matrix and the second portion of the message using a second precoding matrix, where the first precoding matrix is based on a first communication link between the first UE and a network entity, and where the second precoding matrix is based on the first communication link and a second communication link between the first UE and a second UE. In some cases, the first precoding matrix may not be based on (e.g., may be independent of) the second communication link between the first UE and the second UE.

The message portion component 735 may be configured as or otherwise support a means for transmitting the first portion of the message via a first beam associated with the first precoding matrix and the second portion of the message via a second beam associated with the second precoding matrix, where the first portion of the message and the second portion of the message are transmitted according to the uplink grant.

Additionally, or alternatively, the communications manager 720 may support wireless communications at a first UE in accordance with examples as disclosed herein. The message portion component 735 may be configured as or otherwise support a means for receiving, from a second UE, a portion of a first message via a first beam, where the first message is associate with (e.g., creates) interference with a second message received from a network entity. The decoding component 740 may be configured as or otherwise support a means for decoding the portion of the first message, where decoding the portion of the first message is based on one or more parameters associated with the portion of the first message. The decoding component 740 may be configured as or otherwise support a means for decoding the second message based on decoding the portion of the first message.

Figure 8:
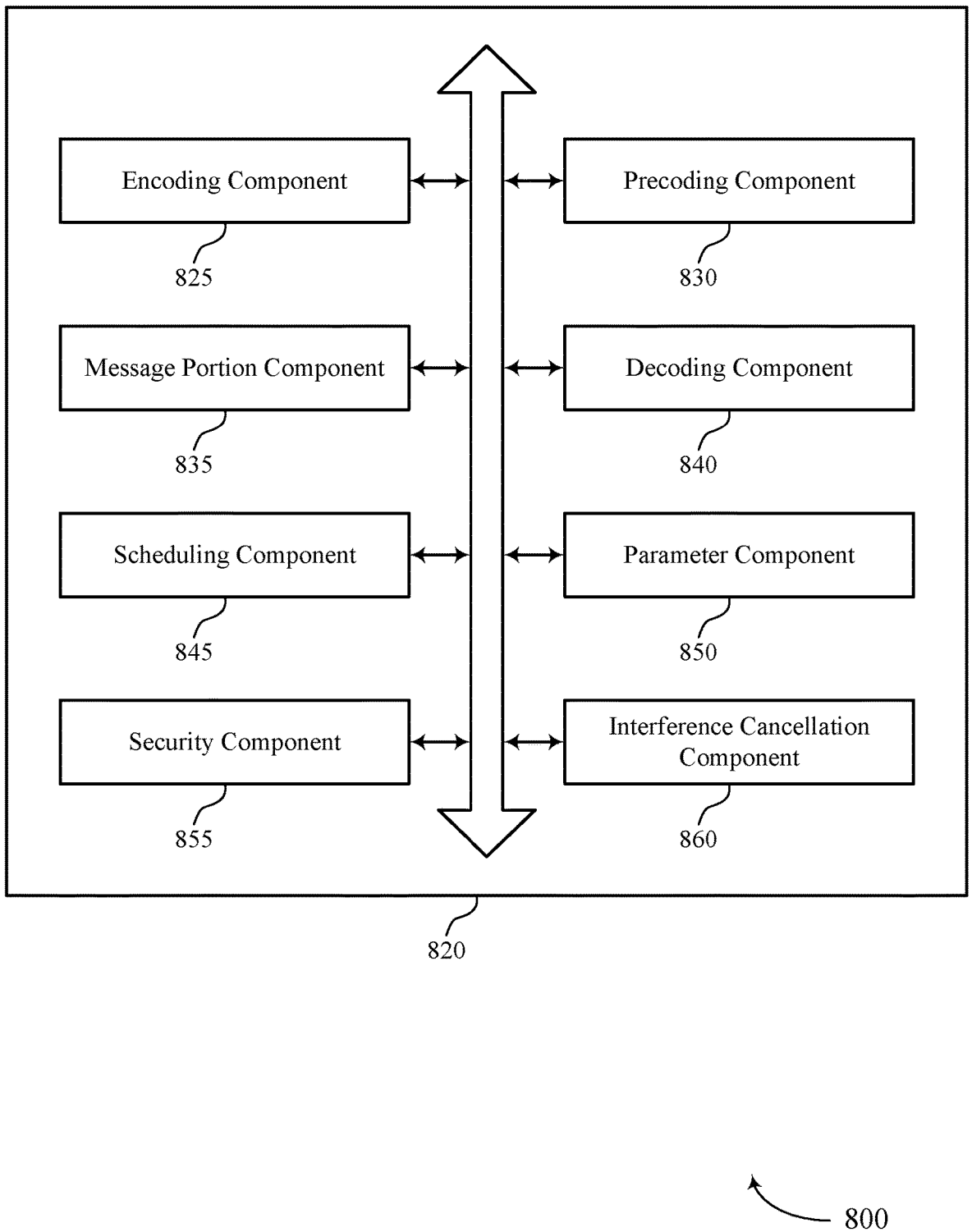
FIG. 8 shows a block diagram of a communications manager that supports CLI mitigation in full-duplex networks in accordance with one or more aspects of the present disclosure.

FIG. 8 shows a block diagram 800 of a communications manager 820 that supports CLI mitigation in full-duplex networks in accordance with one or more aspects of the present disclosure. The communications manager 820 may be an example of aspects of a communications manager 620, a communications manager 720, or both, as described herein. The communications manager 820, or various components thereof, may be an example of means for performing various aspects of CLI mitigation in full-duplex networks as described herein. For example, the communications manager 820 may include an encoding component 825, a precoding component 830, a message portion component 835, a decoding component 840, a scheduling component 845, a parameter component 850, a security component 855, an interference cancellation component 860, or any combination thereof. Each of these components may communicate, directly or indirectly, with one another (e.g., via one or more buses).

The communications manager 820 may support wireless communications at a first UE in accordance with examples as disclosed herein. The encoding component 825 may be configured as or otherwise support a means for encoding a first portion of a message according to a first MCS and a second portion of the message according to a second MCS, where the message is scheduled by an uplink grant. The precoding component 830 may be configured as or otherwise support a means for precoding the first portion of the message using a first precoding matrix and the second portion of the message using a second precoding matrix, where the first precoding matrix is based on a first communication link between the first UE and a network entity, and where the second precoding matrix is based on the first communication link and a second communication link between the first UE and a second UE. In some cases, the first precoding matrix may not be based on (e.g., may be independent of) the second communication link between the first UE and the second UE.

The message portion component 835 may be configured as or otherwise support a means for transmitting the first portion of the message via a first beam associated with the first precoding matrix and the second portion of the message via a second beam associated with the second precoding matrix, where the first portion of the message and the second portion of the message are transmitted according to the uplink grant.

In some examples, the scheduling component 845 may be configured as or otherwise support a means for receiving control signaling including an uplink grant that schedules the message, where the uplink grant includes an indication to separately encode and precode the first portion of the message and the second portion of the message.

In some examples, the uplink grant includes an indication of one or more parameters associated with separately encoding and precoding the first portion of the message and the second portion of the message.

In some examples, the one or more parameters include one or more precoding matrices, one or more sets of resources, one or more MCSs, or any combination thereof.

In some examples, the precoding component 830 may be configured as or otherwise support a means for selecting the first precoding matrix based on a first set of one or more channel metrics associated with the first communication link between the first UE and the network entity. In some examples, the precoding component 830 may be configured as or otherwise support a means for selecting the second precoding matrix based on the first set of one or more channel metrics associated with the first communication link and further based on a second set of one or more channel metrics associated with the second communication link between the first UE and the second UE. Thus, in some cases, the precoding component 830 may be configured as or otherwise support a means for selecting the first precoding matrix where such selecting is not based on (e.g., is independent of) the second set of one or more channel metrics.

In some examples, the parameter component 850 may be configured as or otherwise support a means for receiving control signaling including an indication of one or more parameters associated with splitting the message into the first portion of the message and the second portion of the message, where the first portion of the message and the second portion of the message are based on the one or more parameters.

In some examples, the one or more parameters include a percentage of bits allocated to the first portion of the message, a percentage of bits allocated to the second portion of the message, or both.

In some examples, the one or more parameters include a quantity of bits allocated to the first portion of the message, a quantity of bits allocated to the second portion of the message, or both.

In some examples, the parameter component 850 may be configured as or otherwise support a means for transmitting, to the second UE, control signaling indicating one or more parameters associated with separately encoding and precoding the first portion of the message and the second portion of the message.

In some examples, the one or more parameters include one or more precoding matrices, one or more sets of time resources and frequency resources for transmitting the message, one or more MCSs, or any combination thereof.

In some examples, the parameter component 850 may be configured as or otherwise support a means for transmitting, to the network entity, an indication of one or more parameters associated with the second communication link between the first UE and the second UE.

In some examples, the security component 855 may be configured as or otherwise support a means for transmitting, to the network entity, an indication of a security agreement between the first UE and the second UE.

Additionally, or alternatively, the communications manager 820 may support wireless communications at a first UE in accordance with examples as disclosed herein. In some examples, the message portion component 835 may be configured as or otherwise support a means for receiving, from a second UE, a portion of a first message via a first beam, where the first message (e.g., creates) interference with a second message received from a network entity. The decoding component 840 may be configured as or otherwise support a means for decoding the portion of the first message, where decoding the portion of the first message is based on one or more parameters associated with the portion of the first message. In some examples, the decoding component 840 may be configured as or otherwise support a means for decoding the second message based on decoding the portion of the first message.

In some examples, the parameter component 850 may be configured as or otherwise support a means for receiving control signaling indicating the one or more parameters associated with the portion of the first message.

In some examples, the one or more parameters include one or more precoding matrices, one or more sets of time resources and frequency resources for transmitting the first message, one or more MCSs, a processing delay, or any combination thereof.

In some examples, the control signaling is received from the second UE, the network entity, or both.

In some examples, the interference cancellation component 860 may be configured as or otherwise support a means for performing an interference cancellation procedure based on decoding the portion of the first message, where decoding the second message is based on performing the interference cancellation procedure.

In some examples, the security component 855 may be configured as or otherwise support a means for transmitting, to the network entity, an indication of a security agreement between the first UE and the second UE.

Figure 9:
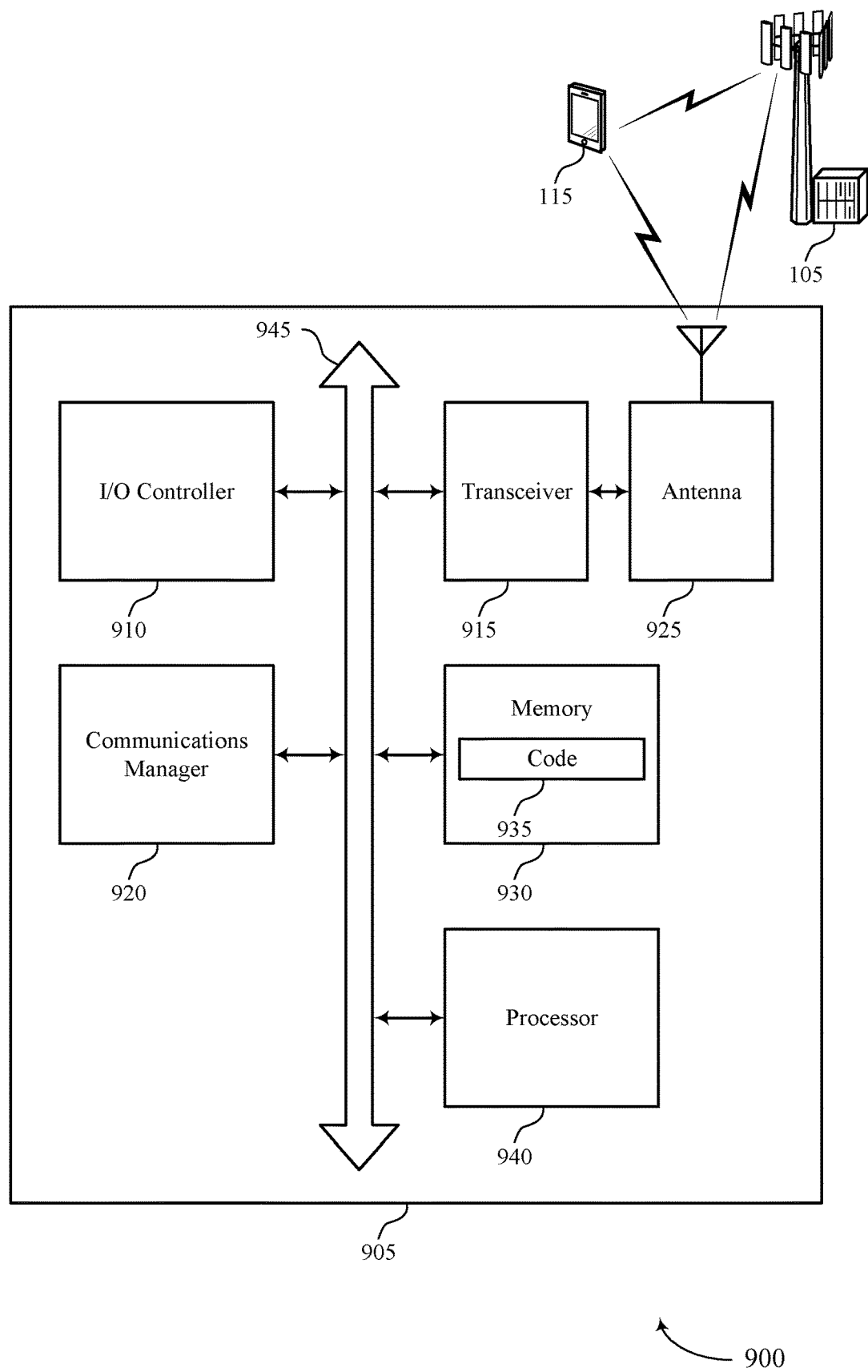
FIG. 9 shows a diagram of a system including a device that supports CLI mitigation in full-duplex networks in accordance with one or more aspects of the present disclosure.

FIG. 9 shows a diagram of a system 900 including a device 905 that supports CLI mitigation in full-duplex networks in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting CLI mitigation in full-duplex networks). For example, the device 905 or a component of the device 905 may include a processor 940 and memory 930 coupled with or to the processor 940, the processor 940 and memory 930 configured to perform various functions described herein.

The communications manager 920 may support wireless communications at a first UE in accordance with examples as disclosed herein. For example, the communications manager 920 may be configured as or otherwise support a means for encoding a first portion of a message according to a first MCS and a second portion of the message according to a second MCS, where the message is scheduled by an uplink grant. The communications manager 920 may be configured as or otherwise support a means for precoding the first portion of the message using a first precoding matrix and the second portion of the message using a second precoding matrix, where the first precoding matrix is based on a first communication link between the first UE and a network entity, and where the second precoding matrix is based on the first communication link and a second communication link between the first UE and a second UE. In some cases, the first precoding matrix may not be based on (e.g., may be independent of) the second communication link between the first UE and the second UE. The communications manager 920 may be configured as or otherwise support a means for transmitting the first portion of the message via a first beam associated with the first precoding matrix and the second portion of the message via a second beam associated with the second precoding matrix, where the first portion of the message and the second portion of the message are transmitted according to the uplink grant.

Additionally, or alternatively, the communications manager 920 may support wireless communications at a first UE in accordance with examples as disclosed herein. For example, the communications manager 920 may be configured as or otherwise support a means for receiving, from a second UE, a portion of a first message via a first beam, where the first message is associated with (e.g., creates) interference with a second message received from a network entity. The communications manager 920 may be configured as or otherwise support a means for decoding the portion of the first message, where decoding the portion of the first message is based on one or more parameters associated with the portion of the first message. The communications manager 920 may be configured as or otherwise support a means for decoding the second message based on decoding the portion of the first message.

By including or configuring the communications manager 920 in accordance with examples as described herein, the device 905 may support techniques for CLI mitigation in full-duplex operations which may result in improved communication reliability, reduced latency, improved user experience related to reduced processing, reduced power consumption, more efficient utilization of communication resources, improved coordination between devices, longer battery life and, improved utilization of processing capability, among other advantages.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of CLI mitigation in full-duplex networks as described herein, or the processor 940 and the memory 930 may be otherwise configured to perform or support such operations.

Figure 10:
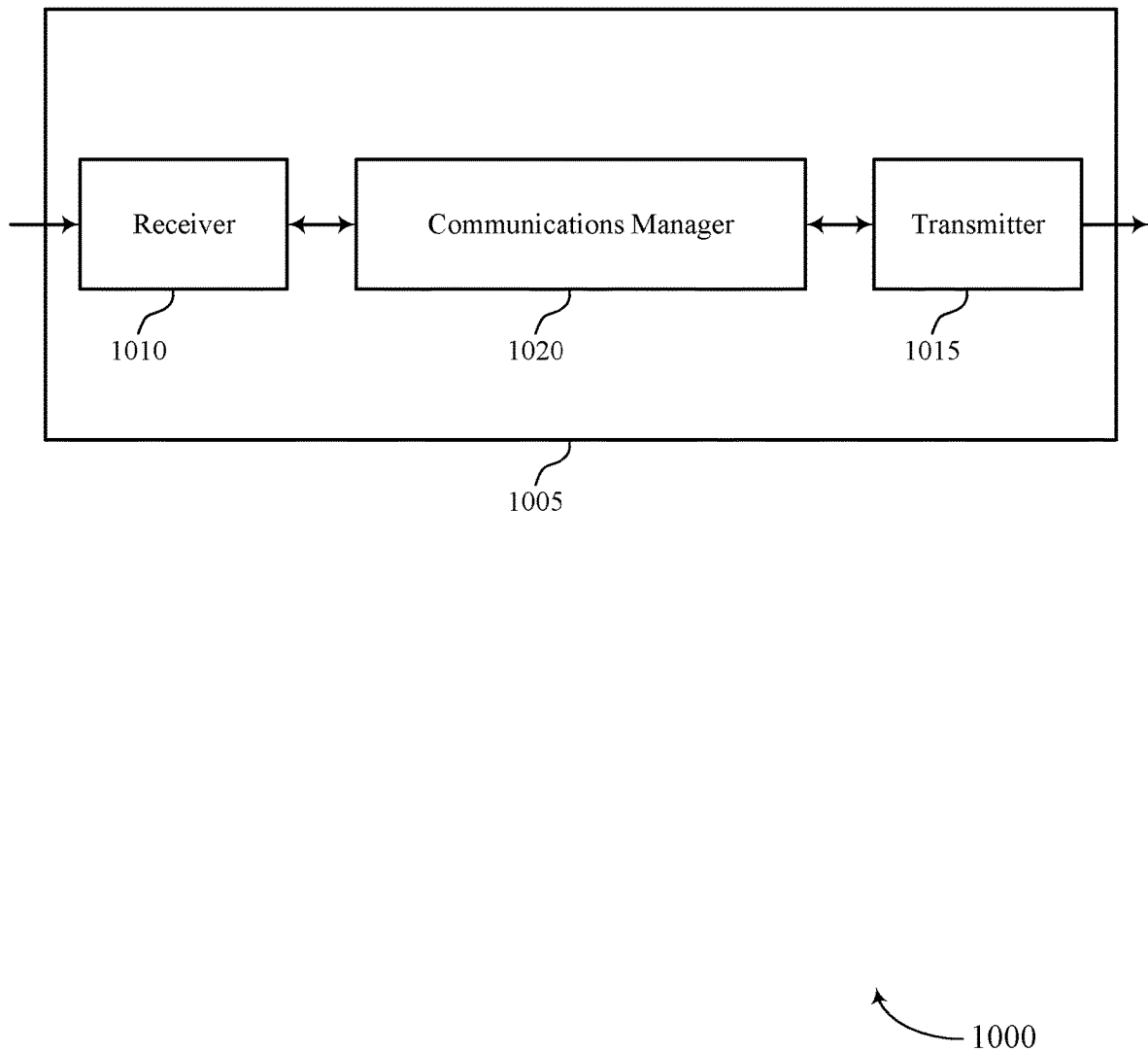
FIGS. 10 and 11 show block diagrams of devices that support CLI mitigation in full-duplex networks in accordance with one or more aspects of the present disclosure.

FIG. 10 shows a block diagram 1000 of a device 1005 that supports CLI mitigation in full-duplex networks in accordance with one or more aspects of the present disclosure. The device 1005 may be an example of aspects of a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of CLI mitigation in full-duplex networks as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications at a network entity in accordance with examples as disclosed herein. For example, the communications manager 1020 may be configured as or otherwise support a means for transmitting control signaling including an uplink grant scheduling a message, where the uplink grant includes an indication to separately encode and precode a first portion of the message and a second portion of the message. The communications manager 1020 may be configured as or otherwise support a means for receiving the first portion of the message associated with a first MCS via a first beam associated with a first precoding matrix and the second portion of the message associated with a second MCS via a second beam associated with a second precoding matrix, where receiving the first portion of the message and the second portion of the message is based on the uplink grant. The communications manager 1020 may be configured as or otherwise support a means for decoding the first portion of the message and the second portion of the message to obtain information associated with the message scheduled by the uplink grant.

By including or configuring the communications manager 1020 in accordance with examples as described herein, the device 1005 (e.g., a processor controlling or otherwise coupled with the receiver 1010, the transmitter 1015, the communications manager 1020, or a combination thereof) may support techniques for CLI mitigation in full-duplex operations which may result in reduced processing, reduced power consumption, and more efficient utilization of communication resources, among other advantages.

Figure 11:
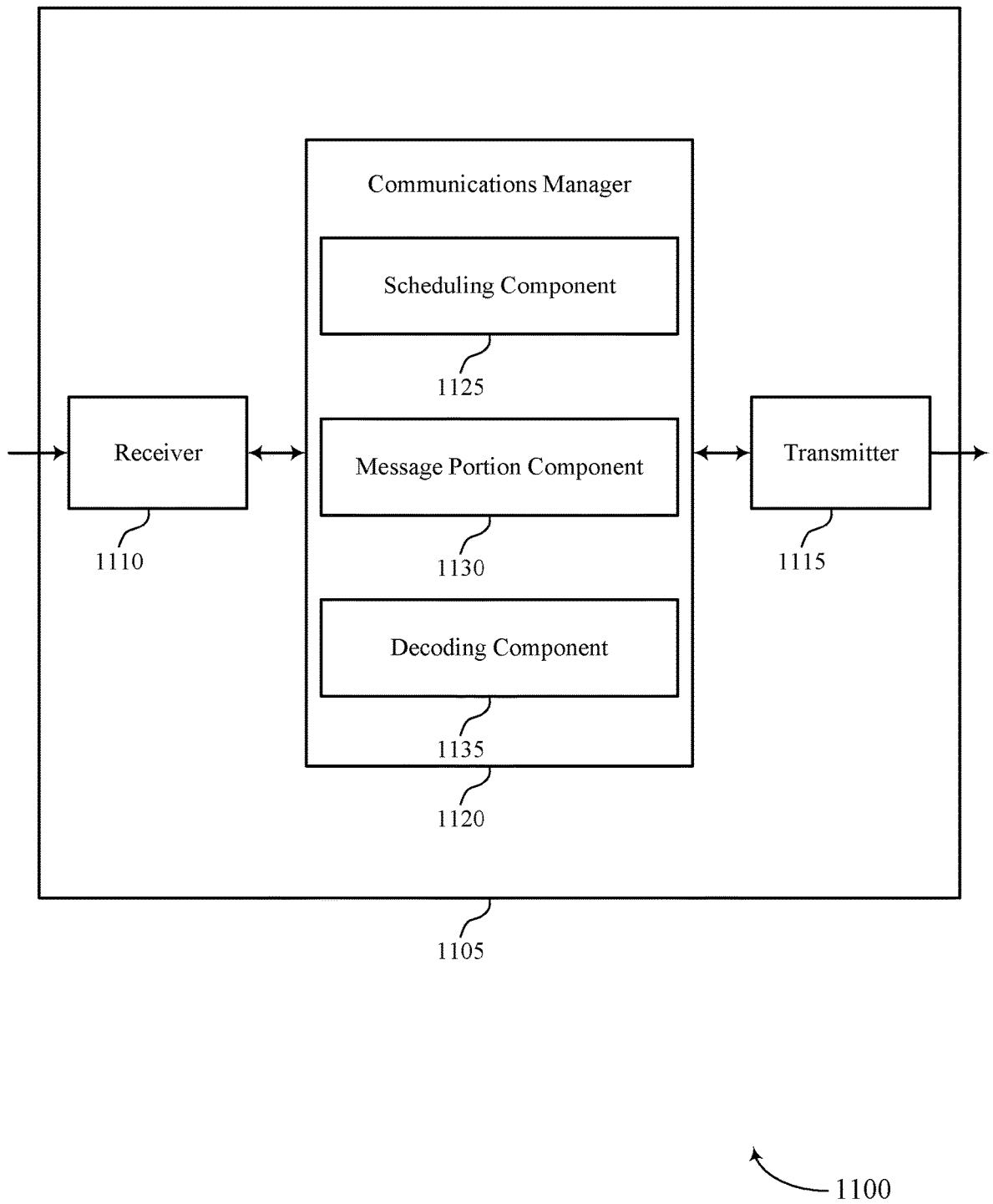

FIG. 11 shows a block diagram 1100 of a device 1105 that supports CLI mitigation in full-duplex networks in accordance with one or more aspects of the present disclosure. The device 1105 may be an example of aspects of a device 1005 or a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of CLI mitigation in full-duplex networks as described herein. For example, the communications manager 1120 may include a scheduling component 1125, a message portion component 1130, a decoding component 1135, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications at a network entity in accordance with examples as disclosed herein. The scheduling component 1125 may be configured as or otherwise support a means for transmitting control signaling including an uplink grant scheduling a message, where the uplink grant includes an indication to separately encode and precode a first portion of the message and a second portion of the message. The message portion component 1130 may be configured as or otherwise support a means for receiving the first portion of the message associated with a first MCS via a first beam associated with a first precoding matrix and the second portion of the message associated with a second MCS via a second beam associated with a second precoding matrix, where receiving the first portion of the message and the second portion of the message is based on the uplink grant. The decoding component 1135 may be configured as or otherwise support a means for decoding the first portion of the message and the second portion of the message to obtain information associated with the message scheduled by the uplink grant.

Figure 12:
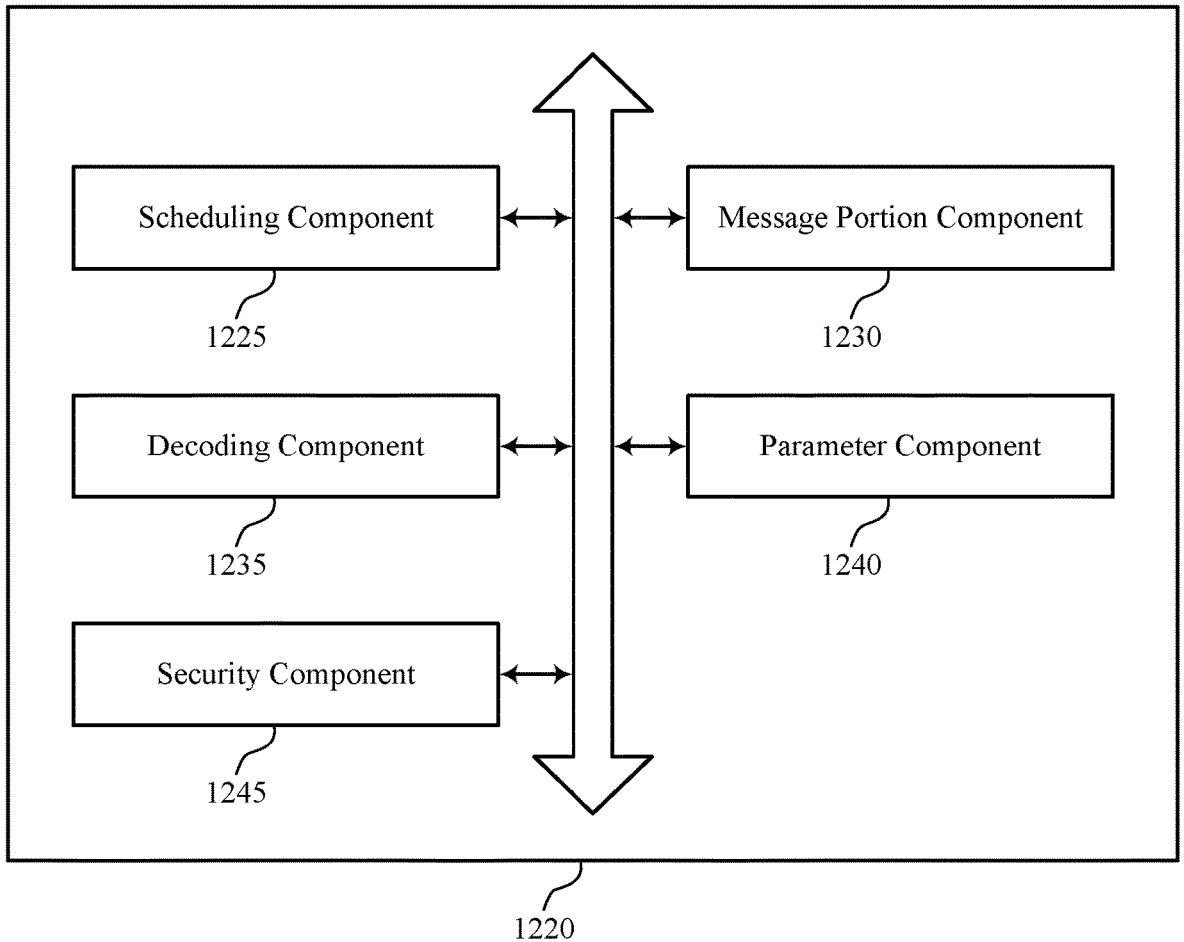
FIG. 12 shows a block diagram of a communications manager that supports CLI mitigation in full-duplex networks in accordance with one or more aspects of the present disclosure.

FIG. 12 shows a block diagram 1200 of a communications manager 1220 that supports CLI mitigation in full-duplex networks in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of CLI mitigation in full-duplex networks as described herein. For example, the communications manager 1220 may include a scheduling component 1225, a message portion component 1230, a decoding component 1235, a parameter component 1240, a security component 1245, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1220 may support wireless communications at a network entity in accordance with examples as disclosed herein. The scheduling component 1225 may be configured as or otherwise support a means for transmitting control signaling including an uplink grant scheduling a message, where the uplink grant includes an indication to separately encode and precode a first portion of the message and a second portion of the message. The message portion component 1230 may be configured as or otherwise support a means for receiving the first portion of the message associated with a first MCS via a first beam associated with a first precoding matrix and the second portion of the message associated with a second MCS via a second beam associated with a second precoding matrix, where receiving the first portion of the message and the second portion of the message is based on the uplink grant. The decoding component 1235 may be configured as or otherwise support a means for decoding the first portion of the message and the second portion of the message to obtain information associated with the message scheduled by the uplink grant.

In some examples, to support transmitting the control signaling, the scheduling component 1225 may be configured as or otherwise support a means for transmitting the control signaling including the uplink grant that schedules the message, where the uplink grant includes an indication of one or more parameters associated with separately encoding and precoding the first portion of the message and the second portion of the message.

In some examples, the one or more parameters include one or more precoding matrices, one or more sets of time resources and frequency resources for transmitting the message, one or more MCSs, or any combination thereof.

In some examples, the one or more precoding matrices includes a first precoding matrix based on a first communication link between a first UE and the network entity and a second precoding matrix based on the first communication link and a second communication link between the first UE and a second UE.

In some examples, the parameter component 1240 may be configured as or otherwise support a means for receiving an indication of one or more parameters associated with the second communication link between the first UE and the second UE.

In some examples, the parameter component 1240 may be configured as or otherwise support a means for transmitting control signaling including an indication of one or more parameters associated with splitting the message into the first portion of the message and the second portion of the message, where the first portion of the message and the second portion of the message are based on the one or more parameters.

In some examples, the one or more parameters indicates a percentage of bits allocated to the first portion of the message, a percentage of bits allocated to the second portion of the message, or both.

In some examples, the one or more parameters indicates a quantity of bits allocated to the first portion of the message, a quantity of bits allocated to the second portion of the message, or both.

In some examples, the parameter component 1240 may be configured as or otherwise support a means for transmitting control signaling indicating one or more parameters associated with separately encoding and precoding the first portion of the message and the second portion of the message.

In some examples, the one or more parameters include one or more precoding matrices, one or more sets of resources, one or more MCSs, a processing delay, or any combination thereof.

In some examples, the security component 1245 may be configured as or otherwise support a means for receiving an indication of a security agreement between a first UE and a second UE.

Figure 13:
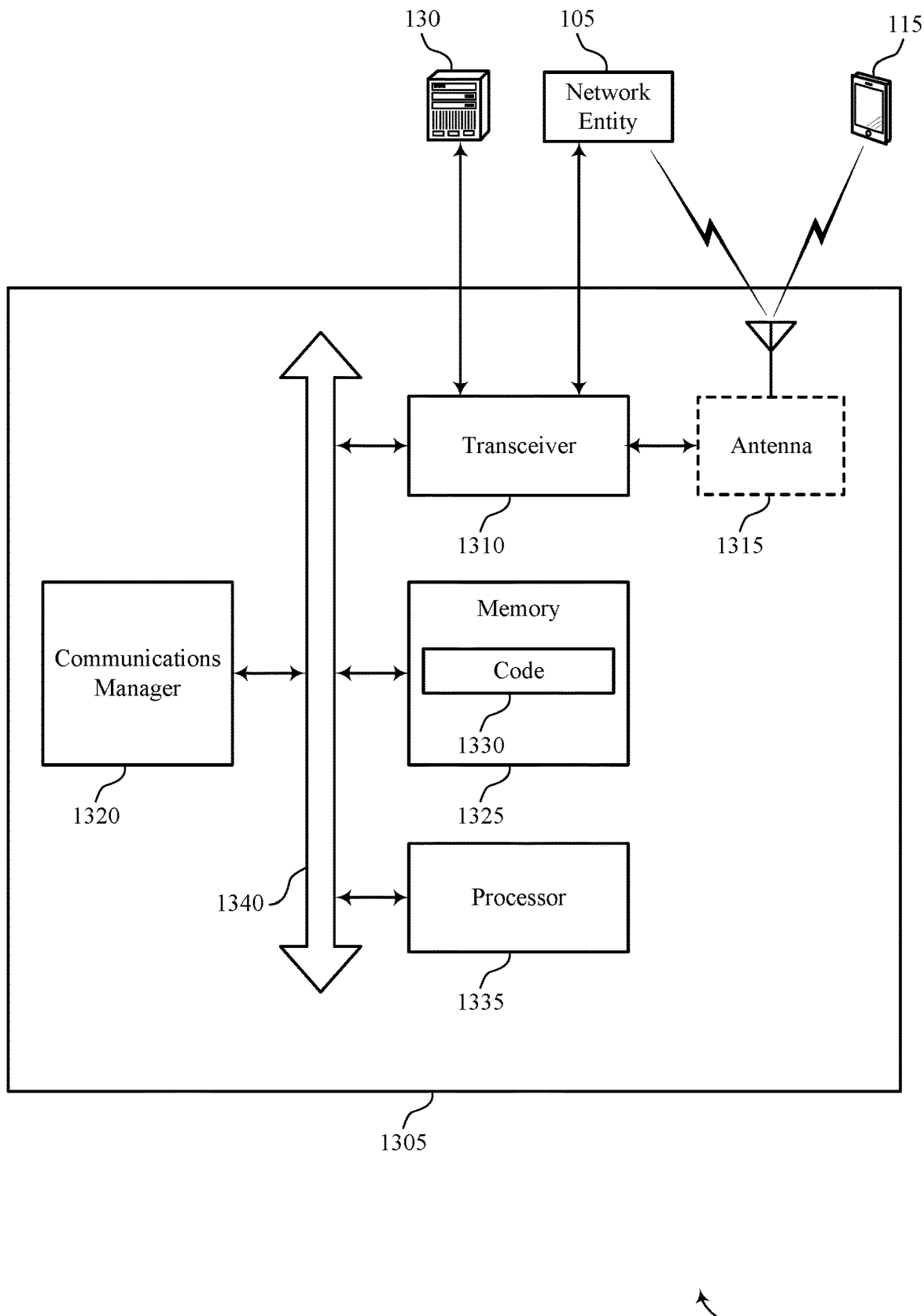
FIG. 13 shows a diagram of a system including a device that supports CLI mitigation in full-duplex networks in accordance with one or more aspects of the present disclosure.

FIG. 13 shows a diagram of a system 1300 including a device 1305 that supports CLI mitigation in full-duplex networks in accordance with one or more aspects of the present disclosure. The device 1305 may be an example of or include the components of a device 1005, a device 1105, or a network entity 105 as described herein. The device 1305 may communicate with one or more network entities 105, one or more UEs 115, or any combination thereof, which may include communications over one or more wired interfaces, over one or more wireless interfaces, or any combination thereof. The device 1305 may include components that support outputting and obtaining communications, such as a communications manager 1320, a transceiver 1310, an antenna 1315, a memory 1325, code 1330, and a processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. The transceiver 1310, or the transceiver 1310 and one or more antennas 1315 or wired interfaces, where applicable, may be an example of a transmitter 1015, a transmitter 1115, a receiver 1010, a receiver 1110, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1325 may include RAM and ROM. The memory 1325 may store computer-readable, computer-executable code 1330 including instructions that, when executed by the processor 1335, cause the device 1305 to perform various functions described herein. The code 1330 may be stored in a non-transitory computer-readable medium such as system memory or another type of memory.

In some cases, the code 1330 may not be directly executable by the processor 1335 but may cause a computer (e.g., when compiled and executed) to perform functions described herein. In some cases, the memory 1325 may contain, among other things, a BIOS which may control basic hardware or software operation such as the interaction with peripheral components or devices.

The processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1335 may be configured to operate a memory array using a memory controller. In some other cases, a memory controller may be integrated into the processor 1335. The processor 1335 may be configured to execute computer-readable instructions stored in a memory (e.g., the memory 1325) to cause the device 1305 to perform various functions (e.g., functions or tasks supporting CLI mitigation in full-duplex networks). For example, the device 1305 or a component of the device 1305 may include a processor 1335 and memory 1325 coupled with the processor 1335, the processor 1335 and memory 1325 configured to perform various functions described herein. The processor 1335 may be an example of a cloud-computing platform (e.g., one or more physical nodes and supporting software such as operating systems, virtual machines, or container instances) that may host the functions (e.g., by executing code 1330) to perform the functions of the device 1305.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the memory 1325, the code 1330, and the processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with other network entities 105 and may include a controller or scheduler for controlling communications with UEs 115 in cooperation with other network entities 105. In some examples, the communications manager 1320 may support an X2 interface within an LTE/LTE-A wireless communications network technology to provide communication between network entities 105.

The communications manager 1320 may support wireless communications at a network entity in accordance with examples as disclosed herein. For example, the communications manager 1320 may be configured as or otherwise support a means for transmitting control signaling including an uplink grant scheduling a message, where the uplink grant includes an indication to separately encode and precode a first portion of the message and a second portion of the message. The communications manager 1320 may be configured as or otherwise support a means for receiving the first portion of the message associated with a first MCS via a first beam associated with a first precoding matrix and the second portion of the message associated with a second MCS via a second beam associated with a second precoding matrix, where receiving the first portion of the message and the second portion of the message is based on the uplink grant. The communications manager 1320 may be configured as or otherwise support a means for decoding the first portion of the message and the second portion of the message to obtain information associated with the message scheduled by the uplink grant.

By including or configuring the communications manager 1320 in accordance with examples as described herein, the device 1305 may support techniques for CLI mitigation in full-duplex operations which may result in improved communication reliability, reduced latency, improved user experience related to reduced processing, reduced power consumption, more efficient utilization of communication resources, improved coordination between devices, longer battery life, and improved utilization of processing capability, among other advantages.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the processor 1335, the memory 1325, the code 1330, the transceiver 1310, or any combination thereof. For example, the code 1330 may include instructions executable by the processor 1335 to cause the device 1305 to perform various aspects of CLI mitigation in full-duplex networks as described herein, or the processor 1335 and the memory 1325 may be otherwise configured to perform or support such operations.

Figure 14:
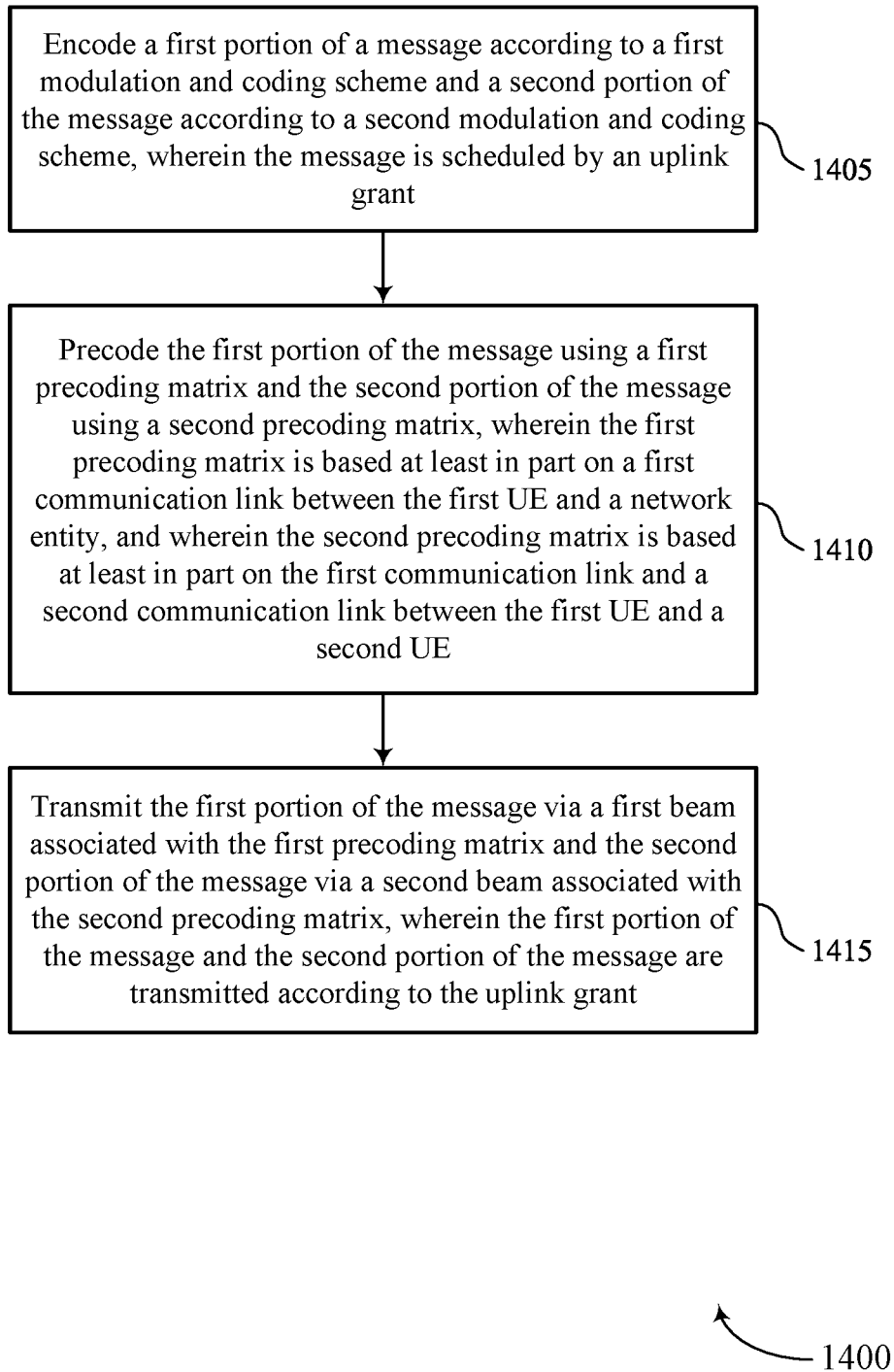
FIGS. 14 through 16 show flowcharts illustrating methods that support CLI mitigation in full-duplex networks in accordance with one or more aspects of the present disclosure.

FIG. 14 shows a flowchart illustrating a method 1400 that supports CLI mitigation in full-duplex networks in accordance with one or more aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include encoding a first portion of a message according to a first MCS and a second portion of the message according to a second MCS, where the message is scheduled by an uplink grant. The operations of 1405 may be performed in accordance with examples as disclosed herein. In some examples, aspects of the operations of 1405 may be performed by an encoding component 825 as described with reference to FIG. 8.

At 1410, the method may include precoding the first portion of the message using a first precoding matrix and the second portion of the message using a second precoding matrix, where the first precoding matrix is based on a first communication link between the first UE and a network entity, and where the second precoding matrix is based on the first communication link and a second communication link between the first UE and a second UE. In some cases, the first precoding matrix may not be based on (e.g., may be independent of) the second communication link between the first UE and the second UE. The operations of 1410 may be performed in accordance with examples as disclosed herein. In some examples, aspects of the operations of 1410 may be performed by a precoding component 830 as described with reference to FIG. 8.

At 1415, the method may include transmitting the first portion of the message via a first beam associated with the first precoding matrix and the second portion of the message via a second beam associated with the second precoding matrix, where the first portion of the message and the second portion of the message are transmitted according to the uplink grant. The operations of 1415 may be performed in accordance with examples as disclosed herein. In some examples, aspects of the operations of 1415 may be performed by a message portion component 835 as described with reference to FIG. 8.

Figure 15:
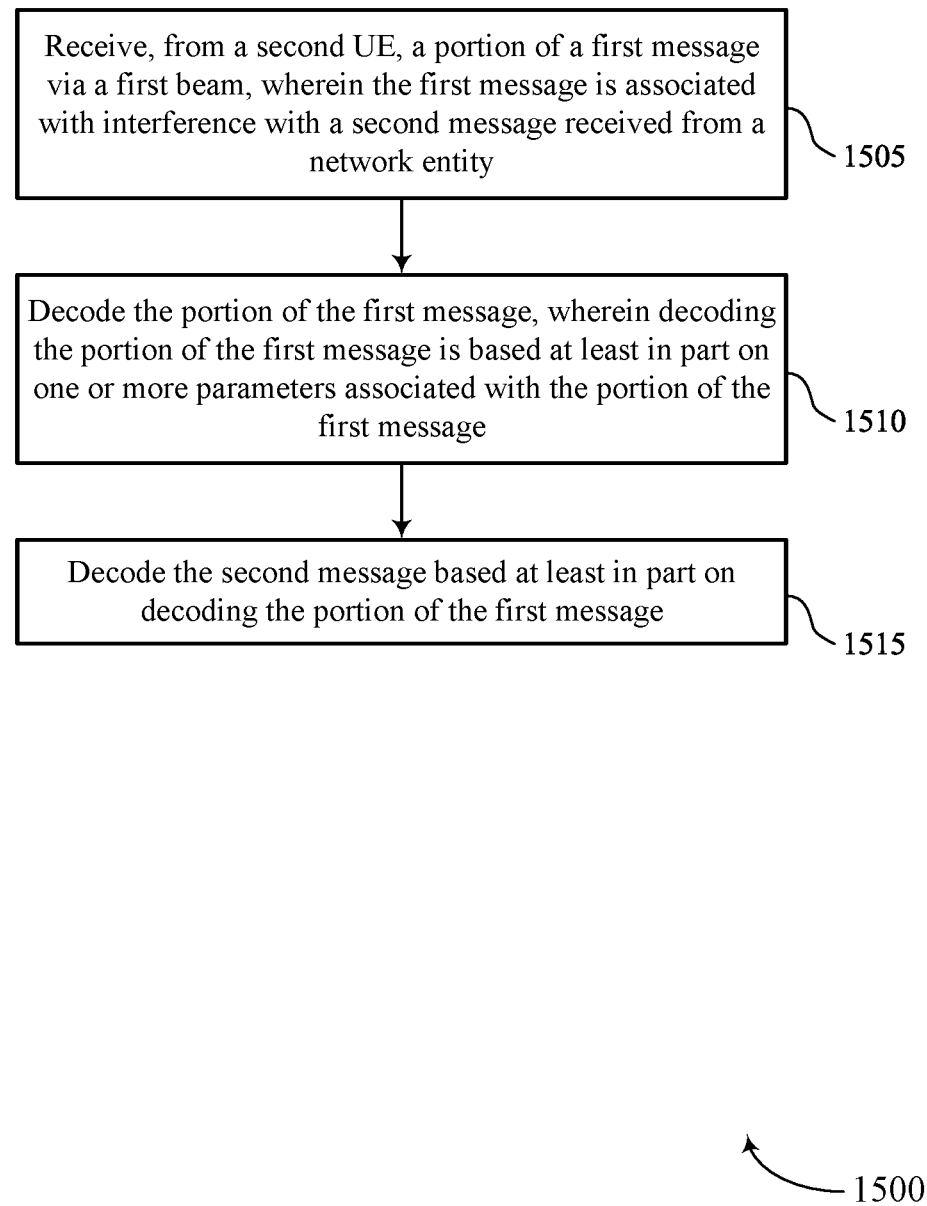

FIG. 15 shows a flowchart illustrating a method 1500 that supports CLI mitigation in full-duplex networks in accordance with one or more aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1505, the method may include receiving, from a second UE, a portion of a first message via a first beam, where the first message is associated with (e.g., creates) interference with a second message received from a network entity. The operations of 1505 may be performed in accordance with examples as disclosed herein. In some examples, aspects of the operations of 1505 may be performed by a message portion component 835 as described with reference to FIG. 8.

At 1510, the method may include decoding the portion of the first message, where decoding the portion of the first message is based on one or more parameters associated with the portion of the first message. The operations of 1510 may be performed in accordance with examples as disclosed herein. In some examples, aspects of the operations of 1510 may be performed by a decoding component 840 as described with reference to FIG. 8.

At 1515, the method may include decoding the second message based on decoding the portion of the first message. The operations of 1515 may be performed in accordance with examples as disclosed herein. In some examples, aspects of the operations of 1515 may be performed by a decoding component 840 as described with reference to FIG. 8.

Figure 16:
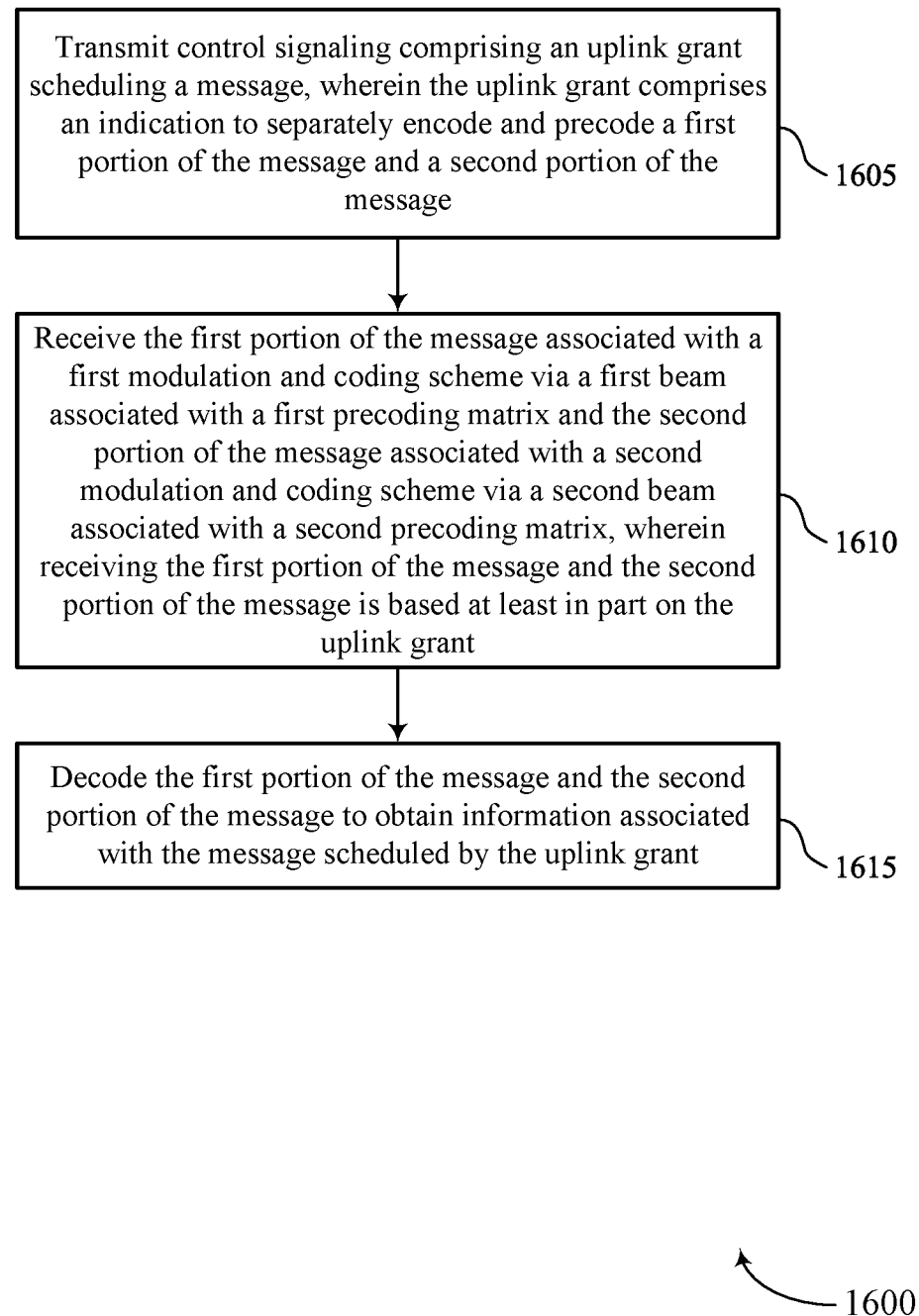

FIG. 16 shows a flowchart illustrating a method 1600 that supports CLI mitigation in full-duplex networks in accordance with one or more aspects of the present disclosure. The operations of the method 1600 may be implemented by a network entity or its components as described herein. For example, the operations of the method 1600 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1605, the method may include transmitting control signaling including an uplink grant scheduling a message, where the uplink grant includes an indication to separately encode and precode a first portion of the message and a second portion of the message. The operations of 1605 may be performed in accordance with examples as disclosed herein. In some examples, aspects of the operations of 1605 may be performed by a scheduling component 1225 as described with reference to FIG. 12.

At 1610, the method may include receiving the first portion of the message associated with a first MCS via a first beam associated with a first precoding matrix and the second portion of the message associated with a second MCS via a second beam associated with a second precoding matrix, where receiving the first portion of the message and the second portion of the message is based on the uplink grant. The operations of 1610 may be performed in accordance with examples as disclosed herein. In some examples, aspects of the operations of 1610 may be performed by a message portion component 1230 as described with reference to FIG. 12.

At 1615, the method may include decoding the first portion of the message and the second portion of the message to obtain information associated with the message scheduled by the uplink grant. The operations of 1615 may be performed in accordance with examples as disclosed herein. In some examples, aspects of the operations of 1615 may be performed by a decoding component 1235 as described with reference to FIG. 12.

The following provides an overview of aspects of the present disclosure:

Aspect 1: A method for wireless communications at a first UE, comprising: encoding a first portion of a message according to a first MCS and a second portion of the message according to a second MCS, wherein the message is scheduled by an uplink grant; precoding the first portion of the message using a first precoding matrix and the second portion of the message using a second precoding matrix, wherein the first precoding matrix is based at least in part on a first communication link between the first UE and a network entity, and wherein the second precoding matrix is based at least in part on the first communication link and a second communication link between the first UE and a second UE; and transmitting the first portion of the message via a first beam associated with the first precoding matrix and the second portion of the message via a second beam associated with the second precoding matrix, wherein the first portion of the message and the second portion of the message are transmitted according to the uplink grant.

Aspect 2: The method of aspect 1, further comprising: receiving control signaling comprising an uplink grant that schedules the message, wherein the uplink grant comprises an indication to separately encode and precode the first portion of the message and the second portion of the message.

Aspect 3: The method of aspect 2, wherein the uplink grant comprises an indication of one or more parameters associated with separately encoding and precoding the first portion of the message and the second portion of the message.

Aspect 4: The method of aspect 3, wherein the one or more parameters include one or more precoding matrices, one or more sets of resources, one or more MCSs, or any combination thereof.

Aspect 5: The method of any of aspects 1 through 4, further comprising: selecting the first precoding matrix based at least in part on a first set of one or more channel metrics associated with the first communication link between the first UE and the network entity; and selecting the second precoding matrix based at least in part on the first set of one or more channel metrics associated with the first communication link and further based at least in part on a second set of one or more channel metrics associated with the second communication link between the first UE and the second UE.

Aspect 6: The method of any of aspects 1 through 5, further comprising: receiving control signaling comprising an indication of one or more parameters associated with splitting the message into the first portion of the message and the second portion of the message, wherein the first portion of the message and the second portion of the message are based at least in part on the one or more parameters.

Aspect 7: The method of aspect 6, wherein the one or more parameters comprise a percentage of bits allocated to the first portion of the message, a percentage of bits allocated to the second portion of the message, or both.

Aspect 8: The method of any of aspects 6 through 7, wherein the one or more parameters comprise a quantity of bits allocated to the first portion of the message, a quantity of bits allocated to the second portion of the message, or both.

Aspect 9: The method of any of aspects 1 through 8, further comprising: transmitting, to the second UE, control signaling indicating one or more parameters associated with separately encoding and precoding the first portion of the message and the second portion of the message.

Aspect 10: The method of aspect 9, wherein the one or more parameters include one or more precoding matrices, one or more sets of time resources and frequency resources for transmitting the message, one or more MCSs, or any combination thereof Aspect 11: The method of any of aspects 1 through 10, further comprising: transmitting, to the network entity, an indication of one or more parameters associated with the second communication link between the first UE and the second UE.

Aspect 12: The method of any of aspects 1 through 11, further comprising: transmitting, to the network entity, an indication of a security agreement between the first UE and the second UE.

Aspect 13: A method for wireless communications at a first UE, comprising: receiving, from a second UE, a portion of a first message via a first beam, wherein the first message creates interference with a second message received from a network entity; decoding the portion of the first message, wherein decoding the portion of the first message is based at least in part on one or more parameters associated with the portion of the first message; and decoding the second message based at least in part on decoding the portion of the first message.

Aspect 14: The method of aspect 13, further comprising: receiving control signaling indicating the one or more parameters associated with the portion of the first message.

Aspect 15: The method of aspect 14, wherein the one or more parameters include one or more precoding matrices, one or more sets of time resources and frequency resources for transmitting the first message, one or more MCSs, a processing delay, or any combination thereof Aspect 16: The method of any of aspects 14 through 15, wherein the control signaling is received from the second UE, the network entity, or both.

Aspect 17: The method of any of aspects 13 through 16, further comprising: performing an interference cancellation procedure based at least in part on decoding the portion of the first message, wherein decoding the second message is based at least in part on performing the interference cancellation procedure.

Aspect 18: The method of any of aspects 13 through 17, further comprising: transmitting, to the network entity, an indication of a security agreement between the first UE and the second UE.

Aspect 19: A method for wireless communications at a network entity, comprising: transmitting control signaling comprising an uplink grant scheduling a message, wherein the uplink grant comprises an indication to separately encode and precode a first portion of the message and a second portion of the message; receiving the first portion of the message associated with a first MCS via a first beam associated with a first precoding matrix and the second portion of the message associated with a second MCS via a second beam associated with a second precoding matrix, wherein receiving the first portion of the message and the second portion of the message is based at least in part on the uplink grant; and decoding the first portion of the message and the second portion of the message to obtain information associated with the message scheduled by the uplink grant.

Aspect 20: The method of aspect 19, wherein transmitting the control signaling comprises: transmitting the control signaling comprising the uplink grant that schedules the message, wherein the uplink grant comprises an indication of one or more parameters associated with separately encoding and precoding the first portion of the message and the second portion of the message.

Aspect 21: The method of aspect 20, wherein the one or more parameters include one or more precoding matrices, one or more sets of time resources and frequency resources for transmitting the message, one or more MCSs, or any combination thereof Aspect 22: The method of aspect 21, wherein the one or more precoding matrices comprises a first precoding matrix based at least in part on a first communication link between a first UE and the network entity and a second precoding matrix based at least in part on the first communication link and a second communication link between the first UE and a second UE.

Aspect 23: The method of aspect 22, further comprising: receiving an indication of one or more parameters associated with the second communication link between the first UE and the second UE.

Aspect 24: The method of any of aspects 19 through 23, further comprising: transmitting control signaling comprising an indication of one or more parameters associated with splitting the message into the first portion of the message and the second portion of the message, wherein the first portion of the message and the second portion of the message are based at least in part on the one or more parameters.

Aspect 25: The method of aspect 24, wherein the one or more parameters indicates a percentage of bits allocated to the first portion of the message, a percentage of bits allocated to the second portion of the message, or both.

Aspect 26: The method of any of aspects 24 through 25, wherein the one or more parameters indicates a quantity of bits allocated to the first portion of the message, a quantity of bits allocated to the second portion of the message, or both.

Aspect 27: The method of any of aspects 19 through 26, further comprising: transmitting control signaling indicating one or more parameters associated with separately encoding and precoding the first portion of the message and the second portion of the message.

Aspect 28: The method of aspect 27, wherein the one or more parameters include one or more precoding matrices, one or more sets of resources, one or more MCSs, a processing delay, or any combination thereof.

Aspect 29: The method of any of aspects 19 through 28, further comprising: receiving an indication of a security agreement between a first UE and a second UE.

Aspect 30: An apparatus for wireless communications at a first UE, comprising a processor; memory coupled with the processor; and instructions stored in the memory and executable by the processor to cause the apparatus to perform a method of any of aspects 1 through 12.

Aspect 31: An apparatus for wireless communications at a first UE, comprising at least one means for performing a method of any of aspects 1 through 12.

Aspect 32: A non-transitory computer-readable medium storing code for wireless communications at a first UE, the code comprising instructions executable by a processor to perform a method of any of aspects 1 through 12.

Aspect 33: An apparatus for wireless communications at a first UE, comprising a processor; memory coupled with the processor; and instructions stored in the memory and executable by the processor to cause the apparatus to perform a method of any of aspects 13 through 18.

Aspect 34: An apparatus for wireless communications at a first UE, comprising at least one means for performing a method of any of aspects 13 through 18.

Aspect 35: A non-transitory computer-readable medium storing code for wireless communications at a first UE, the code comprising instructions executable by a processor to perform a method of any of aspects 13 through 18.

Aspect 36: An apparatus for wireless communications at a network entity, comprising a processor; memory coupled with the processor; and instructions stored in the memory and executable by the processor to cause the apparatus to perform a method of any of aspects 19 through 29.

Aspect 37: An apparatus for wireless communications at a network entity, comprising at least one means for performing a method of any of aspects 19 through 29.

Aspect 38: A non-transitory computer-readable medium storing code for wireless communications at a network entity, the code comprising instructions executable by a processor to perform a method of any of aspects 19 through 29.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." Also, as used herein, the phrase "a set" shall be construed as including the possibility of a set with one member. That is, the phrase "a set" shall be construed in the same manner as "one or more."' to support this interpretation.

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a first user equipment (UE), comprising:
    a processor;
    memory coupled with the processor; and
    instructions stored in the memory and executable by the processor to cause the apparatus to:
        encode a first portion of a message according to a first modulation and coding scheme and a second portion of the message according to a second modulation and coding scheme, wherein the message is scheduled by an uplink grant;
        precode the first portion of the message using a first precoding matrix and the second portion of the message using a second precoding matrix, wherein the first precoding matrix is based at least in part on a first communication link between the first UE and a network entity, and wherein the second precoding matrix is based at least in part on the first communication link and a second communication link between the first UE and a second UE; and
        transmit the first portion of the message via a first beam associated with the first precoding matrix and the second portion of the message via a second beam associated with the second precoding matrix, wherein the instructions are executable by the processor to cause the apparatus to transmit the first portion of the message and the second portion of the message according to the uplink grant.

2. The apparatus of claim 1, wherein the instructions are further executable by the processor to cause the apparatus to:
    receive control signaling comprising an uplink grant that schedules the message, wherein the uplink grant comprises an indication to separately encode and precode the first portion of the message and the second portion of the message.

3. The apparatus of claim 2, wherein the uplink grant comprises an indication of one or more parameters associated with separately encoding and precoding the first portion of the message and the second portion of the message.

4. The apparatus of claim 3, wherein the one or more parameters comprise one or more precoding matrices, one or more sets of resources, one or more modulation and coding schemes, or any combination thereof.

5. The apparatus of claim 1, wherein the instructions are further executable by the processor to cause the apparatus to:
    select the first precoding matrix based at least in part on a first set of one or more channel metrics associated with the first communication link between the first UE and the network entity; and
    select the second precoding matrix based at least in part on the first set of one or more channel metrics associated with the first communication link and further based at least in part on a second set of one or more channel metrics associated with the second communication link between the first UE and the second UE.

6. The apparatus of claim 1, wherein the instructions are further executable by the processor to cause the apparatus to:
    receive control signaling comprising an indication of one or more parameters associated with splitting the message into the first portion of the message and the second portion of the message, wherein the first portion of the message and the second portion of the message are based at least in part on the one or more parameters.

7. The apparatus of claim 6, wherein the one or more parameters comprise a percentage of bits allocated to the first portion of the message, a percentage of bits allocated to the second portion of the message, or both.

8. The apparatus of claim 6, wherein the one or more parameters comprise a quantity of bits allocated to the first portion of the message, a quantity of bits allocated to the second portion of the message, or both.

9. The apparatus of claim 1, wherein the instructions are further executable by the processor to cause the apparatus to:
transmit, to the second UE, control signaling indicating one or more parameters associated with separately encoding and precoding the first portion of the message and the second portion of the message.

10. The apparatus of claim 9, wherein the one or more parameters comprise one or more precoding matrices, one or more sets of time resources and frequency resources for transmitting the message, one or more modulation and coding schemes, or any combination thereof.

11. The apparatus of claim 1, wherein the instructions are further executable by the processor to cause the apparatus to:
transmit, to the network entity, an indication of one or more parameters associated with the second communication link between the first UE and the second UE.

12. The apparatus of claim 1, wherein the instructions are further executable by the processor to cause the apparatus to:
transmit, to the network entity, an indication of a security agreement between the first UE and the second UE.

13. An apparatus for wireless communications at a first user equipment (UE), comprising:
a processor;
memory coupled with the processor; and
instructions stored in the memory and executable by the processor to cause the apparatus to:
receive, from a second UE, a portion of a first message via a first beam, wherein the first message is associated with interference with a second message received from a network entity;
decode the portion of the first message based at least in part on one or more parameters associated with the portion of the first message; and
decode the second message based at least in part on decoding the portion of the first message.

14. The apparatus of claim 13, wherein the instructions are further executable by the processor to cause the apparatus to:
receive control signaling indicating the one or more parameters associated with the portion of the first message.

15. The apparatus of claim 14, wherein the one or more parameters comprise one or more precoding matrices, one or more sets of time resources and frequency resources for transmitting the first message, one or more modulation and coding schemes, a processing delay, or any combination thereof.

16. The apparatus of claim 14, wherein the instructions are executable by the processor to cause the apparatus to receive the control signaling from the second UE, the network entity, or both.

17. The apparatus of claim 13, wherein the instructions are further executable by the processor to cause the apparatus to:
perform an interference cancellation procedure based at least in part on decoding the portion of the first message, wherein the instructions are executable by the processor to cause the apparatus to decode the second message based at least in part on performing the interference cancellation procedure.

18. The apparatus of claim 13, wherein the instructions are further executable by the processor to cause the apparatus to:
transmit, to the network entity, an indication of a security agreement between the first UE and the second UE.

19. An apparatus for wireless communications at a network entity, comprising:
a processor;
memory coupled with the processor; and
instructions stored in the memory and executable by the processor to cause the apparatus to:
transmit control signaling comprising an uplink grant scheduling a message, wherein the uplink grant comprises an indication to separately encode and precode a first portion of the message and a second portion of the message;
receive the first portion of the message associated with a first modulation and coding scheme via a first beam associated with a first precoding matrix and the second portion of the message associated with a second modulation and coding scheme via a second beam associated with a second precoding matrix, wherein the instructions are executable by the processor to cause the apparatus to receive the first portion of the message and the second portion of the message based at least in part on the uplink grant; and
decode the first portion of the message and the second portion of the message to obtain information associated with the message scheduled by the uplink grant.

20. The apparatus of claim 19, wherein, to transmit the control signaling, the instructions are executable by the processor to cause the apparatus to:
transmit the control signaling comprising the uplink grant that schedules the message, wherein the uplink grant comprises an indication of one or more parameters associated with separately encoding and precoding the first portion of the message and the second portion of the message.

21. The apparatus of claim 20, wherein the one or more parameters comprise one or more precoding matrices, one or more sets of time resources and frequency resources for transmitting the message, one or more modulation and coding schemes, or any combination thereof.

22. The apparatus of claim 21, wherein the one or more precoding matrices comprises a first precoding matrix based at least in part on a first communication link between a first UE and the network entity and a second precoding matrix based at least in part on the first communication link and a second communication link between the first UE and a second UE.

23. The apparatus of claim 22, wherein the instructions are further executable by the processor to cause the apparatus to:
receive an indication of one or more parameters associated with the second communication link between the first UE and the second UE.

24. The apparatus of claim 19, wherein the instructions are further executable by the processor to cause the apparatus to:
transmit control signaling comprising an indication of one or more parameters associated with splitting the message into the first portion of the message and the second portion of the message, wherein the first portion of the message and the second portion of the message are based at least in part on the one or more parameters.

25. The apparatus of claim 24, wherein the one or more parameters indicates a percentage of bits allocated to the first portion of the message, a percentage of bits allocated to the second portion of the message, or both.

26. The apparatus of claim 24, wherein the one or more parameters indicates a quantity of bits allocated to the first portion of the message, a quantity of bits allocated to the second portion of the message, or both.

27. The apparatus of claim 19, wherein the instructions are further executable by the processor to cause the apparatus to:
transmit control signaling indicating one or more parameters associated with separately encoding and precoding the first portion of the message and the second portion of the message.

28. The apparatus of claim 27, wherein the one or more parameters comprise one or more precoding matrices, one or more sets of resources, one or more modulation and coding schemes, a processing delay, or any combination thereof.

29. The apparatus of claim 19, wherein the instructions are further executable by the processor to cause the apparatus to:
receive an indication of a security agreement between a first UE and a second UE.

30. A method for wireless communications at a first user equipment (UE), comprising:
encoding a first portion of a message according to a first modulation and coding scheme and a second portion of the message according to a second modulation and coding scheme, wherein the message is scheduled by an uplink grant;
precoding the first portion of the message using a first precoding matrix and the second portion of the message using a second precoding matrix, wherein the first precoding matrix is based at least in part on a first communication link between the first UE and a network entity, and wherein the second precoding matrix is based at least in part on the first communication link and a second communication link between the first UE and a second UE; and
transmitting the first portion of the message via a first beam associated with the first precoding matrix and the second portion of the message via a second beam associated with the second precoding matrix, wherein the first portion of the message and the second portion of the message are transmitted according to the uplink grant.

* * * * *